US007978454B1

(12) United States Patent
Pasqualini

(10) Patent No.: US 7,978,454 B1
(45) Date of Patent: Jul. 12, 2011

(54) ESD STRUCTURE THAT PROTECTS AGAINST POWER-ON AND POWER-OFF ESD EVENT

(75) Inventor: Ronald Pasqualini, Los Altos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 50 days.

(21) Appl. No.: 11/888,472

(22) Filed: Aug. 1, 2007

(51) Int. Cl.
*H02H 9/00* (2006.01)
*H02H 3/22* (2006.01)

(52) U.S. Cl. ......................................... 361/111; 361/56

(58) Field of Classification Search .................... 361/56, 361/91.1, 111
See application file for complete search history.

(56) References Cited

U.S. PATENT DOCUMENTS

| | | | | |
|---|---|---|---|---|
| 5,229,635 | A | 7/1993 | Bessolo et al. | 127/360 |
| 5,239,440 | A | 8/1993 | Merrill | 361/91 |
| 5,561,306 | A * | 10/1996 | Imamura et al. | 257/197 |
| 6,104,588 | A * | 8/2000 | Hariton et al. | 361/111 |
| 6,621,679 | B1 | 9/2003 | Segervall | 361/111 |
| 6,621,680 | B1 | 9/2003 | Segervall | 361/111 |
| 6,667,870 | B1 | 12/2003 | Segervall | 361/111 |
| 6,690,555 | B1 | 2/2004 | Pasqualini | 361/56 |
| 6,801,416 | B2 * | 10/2004 | Hatzilambrou et al. | 361/56 |
| 6,879,476 | B2 * | 4/2005 | Khazhinsky et al. | 361/56 |
| 6,977,420 | B2 | 12/2005 | Pasqualini | 257/355 |
| 7,038,898 | B1 | 5/2006 | Pasqualini | 361/56 |
| 7,085,113 | B2 | 8/2006 | Gauthier, Jr. et al. | 361/56 |
| 7,098,511 | B2 | 8/2006 | Ker et al. | 257/360 |
| 7,110,228 | B2 * | 9/2006 | Chang | 361/56 |
| 7,280,328 | B2 * | 10/2007 | Arai et al. | 361/56 |
| 7,403,362 | B2 * | 7/2008 | Lee et al. | 361/56 |
| 7,430,100 | B2 * | 9/2008 | Bhattacharya et al. | 361/91.1 |
| 2004/0027742 | A1 * | 2/2004 | Miller et al. | 361/52 |
| 2006/0044004 | A1 * | 3/2006 | Bhushan et al. | 324/769 |
| 2007/0195472 | A1 * | 8/2007 | Kwak et al. | 361/56 |

FOREIGN PATENT DOCUMENTS

WO    WO 2007/010472 A2    1/2007

OTHER PUBLICATIONS

Nitin Mohan and Anil Kumar, "Modeling ESD Protection", IEEE Potentials, Feb./Mar. 2005, pp. 21-24.
Albert Z.H. Wang and Chen-Hui Tsay, "An On-Chip ESD Protection Circuit With Low Trigger Voltage in BiCMOS Technology", IEEE Journal of Solid-State Circuits, vol. 36, No. 1, Jan. 2001, pp. 40-45.
Ming-Dou Ker and Kun-Hsien Lin, "Design on ESD Protection Scheme for IC with Power-Down-Mode Operation", IEEE Journal of Solid-State Circuits, vol. 39, No. 8, Aug. 2004, pp. 1378-1382.
Benny Lee, "An Overview of ESD Protection Devices," Compliance Engineering, 2001 Annual Reference Guide, vol. 18, No. 3, 2001, pp. 134 and 136-137.
Jeffrey Dunnihoo, "ESD Protection for High-Speed I/O Signals," Compliance Engineering, 2003 Annual Reference Guide, vol. 20, No. 3, 2003, pp. 80-83.

* cited by examiner

Primary Examiner — Stephen W Jackson
Assistant Examiner — Tien Mai
(74) Attorney, Agent, or Firm — Mark C. Pickering

(57) ABSTRACT

An electrostatic discharge protection circuit (ESD protection circuit) provides ESD protection to all NMOS/PMOS transistors that are connected to the pins of a CMOS integrated circuit (IC). The ESD protection circuit will protect the CMOS IC against an ESD event, regardless of whether the CMOS IC is powered up, or powered down.

20 Claims, 17 Drawing Sheets

ESD STRUCTURE THAT PROTECTS AGAINST POWER-ON AND POWER-OFF ESD EVENT

BACKGROUND OF THE INVENTION

1. Field of the Invention

The present invention relates to an ESD protection structure and, more particularly, to an ESD protection structure that protects against power-on and power-off ESD events.

2. Description of the Related Art

An integrated circuit chip can be destroyed when an unintentional voltage spike, known as an electrostatic discharge (ESD) event, is applied across the pins of the chip. Thus, to guard against unintentional voltage spikes, current-generation chips include ESD protection circuits that protect the chips from ESD events.

FIGS. 1A-1B show schematic diagrams that illustrate a prior-art ESD protected chip 100. As shown in FIGS. 1A-1B, chip 100 has a number of I/O cells 110, including I/O cell 110-1 and I/O cell 110-2, and an ESD protection circuit 112 that is connected to each of the I/O cells 110. The I/O cells 110, in turn, have a number of pins 114, including a pin 114-1 and a pin 114-2, which provide external connections to the electrical circuits within the chip. In the present example, I/O cell 110-1 has a pin 114-1, while I/O cell 110-2 has a pin 114-2.

As further shown in FIGS. 1A-1B, ESD protection circuit 112 includes a number of upper diodes 116, including upper diodes 116-1 and 116-2, that are associated with the I/O cells 110 so that each upper diode 116 is connected to a pin 114. For example, upper diode 116-1 is connected to pin 114-1 and upper diode 116-2 is connected to pin 114-2. ESD protection circuit 114 also includes a number of lower diodes 118, including lower diodes 118-1 and 118-2, that are associated with the I/O cells 110 so that each lower diode 118 is connected to a pin 114. For example, lower diode 118-1 is connected to pin 114-1 and lower diode 118-2 is connected to pin 114-2.

In addition, ESD protection circuit 112 includes an esdPlus rail 120, an esdMinus rail 122, and an ESD switch 124 that is connected between esdPlus rail 120 and esdMinus rail 122. EsdPlus rail 120 is connected to the cathodes of the upper ESD diodes 116 that are connected to the pins 114. Similarly, esdMinus rail 122 is connected to the anodes of the lower ESD diodes 118 that are connected to the pins 114.

Since the esdPlus and esdMinus rails 120 and 122 pass through each of the I/O cells 110, and are connected to each of the pins 114 by way of the diodes 116 and 118, rails 120 and 122 are usually implemented as closed rectangular rings that are located around the periphery of the chip. As shown in FIGS. 1A and 1B, the esdPlus and esdMinus rings 120 and 122 can be left floating (i.e. not connected to GND or VDD). However, in most ESD applications, esdPlus ring 120 is usually connected to the highest VDD voltage and esdMinus ring 122 is usually connected to ground (VSS).

In operation, ESD protection circuit 112 protects chip 100 against ESD damage by providing a low impedance current path between the two pins 114 that are being zapped. This low impedance current path ensures that the pin voltage remains within acceptable limits during a zap, protecting the chip from being damaged.

For example, as shown in FIG. 1A, if pin 114-1 is zapped positive with respect to pin 114-2, ESD protection circuit 112 allows the ESD current Izap to flow in from pin 114-1, up through diode 116-1, down through ESD switch 124, up through diode 118-2, and out to pin 114-2. Similarly, as shown in FIG. 1B, if pin 114-1 is zapped negative with respect to pin 114-2, ESD protection circuit 112 allows the ESD current Izap to flow in from pin 114-2, up through diode 116-2, down through ESD switch 124, up through diode 118-1, and out to pin 114-1.

As illustrated in FIGS. 1A and 1B, ESD switch 124 only closes during an ESD event, and must remain open during normal chip operation. Furthermore, in accordance with the above description, ESD switch 124 is only required to conduct current in one direction. Thus, independent of whether pin 114-1 is being zapped positive with respect to pin 114-2, or negative with respect to pin 114-2, the ESD current Izap flows in the same direction through ESD switch 124. In other words, ESD switch 124 is a unidirectional switch.

When a human body model (HBM) ESD test is being performed, an ESD zap voltage must be applied with an ESD Zap generator. FIG. 2 shows a schematic diagram that illustrates a prior-art ESD zap generator 200. As shown in FIG. 2, ESD zap generator 200 consists of three serially connected components: a 100 pf capacitor Czap, a 1.5K resistor Rzap, and a voltage generator Vzap.

The voltage generator provides the ESD zap voltage by ramping up from 0V to a peak zap voltage (Vzap-peak) in 6 ns. The 6 ns ramp time accounts for the inductance of the human body. For example, in a 4 KV zap test, the zap voltage would ramp up from 0V to 4 KV in 6 ns, resulting in a peak zap current of 2.7 amps (4 KV divided by 1.5K). This calculation assumes that the maximum equivalent resistance allowed between the two pins being zapped is much less than 1.5K ohms. (This is always the case, as explained in greater detail below.)

The peak ESD transient voltage allowed at a zapped I/O pin depends upon the gate oxide thickness of the CMOS transistors that are connected to the pins. Using a 0.13 micron process as an example, the nominal transistor gate oxide thickness is approximately 20 angstroms, resulting in a maximum allowable peak pin transient voltage of approximately 4V.

In the above example, the peak pin transient voltage is 4V, and the peak ESD current (for a 4 KV zap) is 2.7 amps. Thus, the maximum 'equivalent resistance' allowed between the two pins being zapped is only 1.48 ohms (4V divided by 2.7 A). As previously stated, this equivalent resistance is much less than the 1.5K Rzap value.

Referring again to FIGS. 1A and 1B, the maximum equivalent resistance allowed between two zapped I/O pins 114 is the total resistance of the following ESD components connected in series: two forward biased ESD diodes, one ESD switch, and the metal resistance of the esdPlus/esdMinus rings that connect these components together. In the above example, the total resistance of all components in the ESD current path is only 1.48 ohms. In other words, each component in the ESD current path must have extremely low resistance.

FIG. 3 shows a schematic diagram that illustrates a prior-art ESD protected chip 300. Chip 300 is similar to chip 100 and, as a result, utilizes the same reference numerals to designate the structures which are common to both chips. As shown in FIG. 3, chip 300 differs from chip 100 in that chip 300 has an ESD switch 124 placed in each corner of chip 300.

As discussed above, the ESD switches 124 shown in FIGS. 1A-1B and FIG. 3 must close only during an ESD event (i.e. they must remain open during normal chip operation). In addition, the ESD switches 124 must also remain open while the chip is being powered up (i.e. while the VDD voltage is rising from 0V to its final DC value). If all of these conditions are not met, catastrophic events can occur.

For example, if the ESD switches 124 were to close during normal chip operation (or while chip 300 is being powered up), DC paths would exist from any pin 114 to all of the other pins 114 (through the upper/lower ESD diodes 116/118, the ESD switch(s) 124 and the esdPlus/esdMinus rings 120 and 122). Of course, this condition would cause the chip to malfunction.

Furthermore, assuming that esdPlus ring 120 is tied to the power supply voltage VDD and esdMinus ring 122 is tied to the ground line VSS (which is usually the case), if the ESD switches 124 were to close while chip 300 is being powered up, the VDD power supply would be effectively shorted to VSS until the ESD switches 124 opened (i.e. no ESD diodes would be involved).

ESD events usually last for only a short period of time, on the order of 10 ns to 100 ns. Furthermore, assuming that the VDD power supply is being derived from the 60 Hz AC line, the VDD voltage cannot rise faster than 4 ms (¼ cycle of the 60 Hz AC line frequency). In addition, in battery powered applications, the VDD rise time usually cannot rise faster than a microsecond or so. Thus, because an ESD event is much faster than a VDD power-on event, these two events can be easily distinguished from one another. From a circuit perspective, this can by accomplished by employing an ESD switch with a simple RC time constant.

FIG. 4 shows a schematic diagram that illustrates a prior-art ESD switch 400 that is based upon an RC time constant. ESD switch 400 can be used to implement one ESD switch 124. Referring to FIG. 4, ESD switch 400, which is sometimes known as a 'triggerswitch,' has five components: three transistors P1, N1, and N2, one resistor R1, and one capacitor C1. Three of the components define a transistor circuit 408 that includes transistors P1 and N1, which form a P1/N1 inverter 410, and NMOS transistor N2. The remaining two components (resistor R1 and capacitor C1) define an RC time constant circuit 412.

The switch portion of triggerswitch 400 is provided by NMOS transistor N2. Thus, when transistor N2 is turned on during an ESD event, transistor N2 essentially acts as a closed switch, 'shorting' esdPlus ring 120 to esdMinus ring 122.

The trigger portion of triggerswitch 400 is provided by P1/N1 inverter 410, and resistor R1 and capacitor C1 of RC time constant circuit 412. RC time constant circuit 412 defines how quickly the input voltage to P1/N1 inverter 410 can follow the rising voltage on the esdPlus ring 120. As shown in FIG. 4, the supply voltage for P1/N1 inverter 410 comes from the esdPlus ring 120. Furthermore, the input voltage to P1/N1 inverter 410 can turn transistor switch N2 on or off.

Since the risetime of the VDD power supply is much slower than the risetime of an ESD event, the R1*C1 time constant can be chosen such that it is much shorter than the risetime of the VDD power supply, but much longer than the risetime of an ESD event. As a consequence of this, and as described in greater detail below, triggerswitch 400 in FIG. 4 will remain off while VDD is rising, but it will turn on during an ESD event.

Referring to FIG. 4, and as described above, in most ESD applications esdPlus ring 120 is normally connected to VDD and esdMinus ring 122 is normally connected to VSS. Thus, as the VDD power supply voltage begins to rise during a normal power-on sequence, the voltage on esdPlus ring 120 will begin to rise. Moreover, as the voltage on esdPlus ring 120 begins to rise, the voltage at the input of P1/N1 inverter 410 will also begin to rise at a slightly slower rate, due to the R1*C1 time constant.

Consequently, while the VDD voltage is rising, the voltage at the input of P1/N1 inverter 410 will closely follow the rising VDD voltage on esdPlus ring 120. Because of this, the output of P1/N1 inverter 410 will remain close to ground while the VDD voltage is rising. As a consequence, transistor switch N2 will remain off during chip power-up, which is exactly the required circuit behavior.

As described above, the R1*C1 time constant can be made much longer than the risetime of an ESD event. As a consequence of this, and as described in greater detail below, triggerswitch 400 in FIG. 4 will turn on during an ESD event.

Prior to a power-off ESD event (power-off zap), the voltages on all of the nodes in FIG. 4 will initially be at 0 volts (ground). Therefore, capacitor C1 in FIG. 4 will be in a discharged state prior to a power-off zap.

Because the R1*C1 time constant is much longer than the time constant of an ESD event, when an ESD event occurs, the voltage on esdPlus ring 120 will rise much faster than the voltage on capacitor C1. In other words, the voltage on capacitor C1 will remain close to ground during a power-off ESD event.

As a consequence of this, the input voltage to P1/N1 inverter 410 in FIG. 4 will also remain close to ground during a power-off ESD event. Therefore, as the voltage on esdPlus ring 120 rises during a power-off ESD event, the inverter output voltage will also rise, turning on switch transistor N2 in FIG. 4. This, in turn, provides a low impedance path for the ESD zap current, from the esdPlus ring 120 to the esdMinus ring 122.

Referring to FIG. 4, when the ESD zap current begins to decrease, the voltage on esdPlus ring 120 will also begin to decrease. This, in turn, will cause the gate voltage of switch transistor N2 to decrease. This gate voltage decrease will ultimately cause switch transistor N2 to turn off, effectively ending the ESD event.

FIGS. 5A-5C show waveform diagrams that illustrate an example of a prior-art 4 KV power-off zap. FIG. 5A shows the 4 KV zap voltage V1 that is being applied between the two zapped pins, in accordance with the HBM model (human body model).

In conjunction with FIGS. 1A and 1B, FIG. 5B shows the zap voltage V2 at a pin 114 that is being positively zapped, and FIG. 5C shows the zap voltage V3 at another pin 114 that is being negatively zapped.

Referring to FIG. 5A, the ESD zap voltage V1 begins at 0 volts and rises to a 4 KV peak zap voltage ZV1. In accordance with the HBM, the risetime of the ZV1 zap voltage is equal to 6 ns, which accounts for the inductance of the human body.

Referring to FIG. 5A, by the time that the zap voltage V1 has risen to only 40V, the voltages V2 and V3 have already reached their peak voltages ZV2 and −ZV3 respectively, after which time both voltages begin to decay. In other words, after the voltages V2 and V3 have peaked, the ESD event has effectively ended, even though all of the circuit waveforms have not yet decayed to zero.

Of course, an ESD event will have ended successfully if the magnitudes of both peak pin-to-substrate voltages (ZV2 and −ZV3) are less than the maximum pin-to-substrate voltage allowed. Conversely, an ESD event will have ended unsuccessfully if the magnitude of either one of the peak pin-to-substrate voltages is greater than the maximum pin-to-substrate voltage allowed.

As described in greater detail below, ESD protection circuit 112 cannot protect CMOS chips after they have been powered up. In other words, ESD protection circuit 112 is totally unsuitable for protecting CMOS chips under power-on operating conditions, after they have been mounted onto a printed circuit board (PCB). Of course, this is a very serious limitation.

As described above, in most ESD applications, esdPlus ring 120 is connected to VDD and esdMinus ring 122 is connected to VSS (ground). Thus, after a CMOS chip has been powered-up, the voltage on esdPlus ring 120 will be equal to VDD, and the voltage on esdMinus ring 122 will be equal to 0V (ground). Because of these operating conditions, the voltage on capacitor C1 will be equal to VDD. As a consequence of this, the input of P1/N1 inverter 410 in FIG. 4 will also be equal to VDD, and the inverter output voltage will be equal to 0V (ground). Moreover, because the output of inverter 410 is 0V, switch transistor N2 will be held in its turned-off state under powered-up operating conditions.

Thus, if an ESD zap occurs while a chip is powered-up, an ESD zap current will begin to flow. As the ESD zap current increases, it will cause the voltage on esdPlus ring 120 to increase. Furthermore, because the R1*C1 time constant in FIG. 4 is much greater than the risetime of an ESD event, the voltage on capacitor C1 in FIG. 4 will remain close to VDD during the entire ESD zap. Consequently, the input to P1/N1 inverter 410 will also remain close to VDD during the entire ESD zap. Because of this, the output of P1/N1 inverter 410 will be forced to remain close to 0V (ground) during the entire ESD zap.

Moreover, because the output of P1/N1 inverter 410 remains close to 0V, switch transistor N2 will be forced to remain in its turned-off state, during the entire powered-up ESD zap. Consequently, because switch transistor N2 remains off, the ESD zap current will not be able to flow from a positively zapped pin to a negatively zapped pin. In other words, the zap current will not be able to flow from esdPlus ring 120 to esdMinus ring 122. Of course, this circuit condition causes the voltage at a positively zapped pin to increase until it exceeds the maximum gate-to-substrate voltage allowed. As a consequence of this, one or more of the transistors connected to a positively zapped pin will be destroyed by a power-on ESD zap.

FIG. 6 shows a schematic diagram that illustrates a prior-art ESD protected chip 600. Chip 600 is similar to chip 300 and, as a result, utilizes the same reference numerals to designate structures that are common to both chips.

As shown in FIGS. 3 and 6, chip 300 and chip 600 both contain I/O cells 110, each of which includes an upper ESD diode 116 and a lower ESD diode 118. Furthermore, chip 300 and chip 600 also contain a high current esdPlus ring 120 and a high current esdMinus ring 122.

Nevertheless, chip 600 differs from chip 300 in that chip 600 utilizes an ESD switch 608 in lieu of the ESD corner switches 124 that are utilized by chip 300. ESD switch 608 is similar to ESD switch 400 and, as a result, utilizes the same reference numerals to designate structures that are common to both switches.

Referring to FIG. 6, it can be seen that ESD switch 608 is identical to switch 400, except that ESD switch 608 has a transistor circuit 408 located in each I/O cell 110, and an RC time constant circuit 412 located in each corner of chip 600.

As further shown in FIG. 6, chip 600 also differs from chip 300 in that chip 600 includes an esdTiming ring 610. EsdTiming ring 610 connects the four RC time constant circuits 412 located in the four corners of chip 600 to the inputs of the distributed P1/N1 inverters 410 of the transistor circuits 408 located inside of each I/O cell 110.

In addition, because esdTiming ring 610 only carries low current (i.e. the ESD timing signal), the metal width of esdTiming ring 610 can be made very small. In other words, the resistance of esdTiming ring 610 can be relatively high because the voltage on esdTiming ring 610 is not required to change during a power-off ESD zap (i.e. the ring voltage must remain close to 0V).

Chip 600 is known as a 'distributed slave clamp' circuit because the high current switch (clamp) transistors N2 are now distributed inside of each I/O cell 110, instead of being located in the four corners of chip 600. Thus, when a power-off ESD event occurs, all of the switch transistors N2, in all of the I/O cells 110 will turn on, providing very low resistance connections (in parallel) from esdPlus ring 120 to esdMinus ring 122.

Although it is 'traditional' to employ four timing resistors R1, and four timing capacitors C1, in the four corners of chip 600, the four timing resistors R1 are in parallel with each other. Similarly, the four timing capacitors C1 are also in parallel with each other. Thus, for power-off ESD zaps, it is permissible to connect only one R1 element, and only one C1 element, to esdTiming ring 610.

Although the circuit topology of chip 600 is somewhat different from the circuit topology of chip 300, both chips operate in exactly the same manner. In other words, both chips suffer from the severe limitation that they cannot protect against ESD zaps that occur during normal power-on chip operation, with VDD voltage already applied to the chip. Because of this limitation, there is a great need for an improved ESD protection circuit that can protect against power-on zaps, and can also protect against power-off zaps.

DETAILED DESCRIPTION OF THE INVENTION

Figure 7:
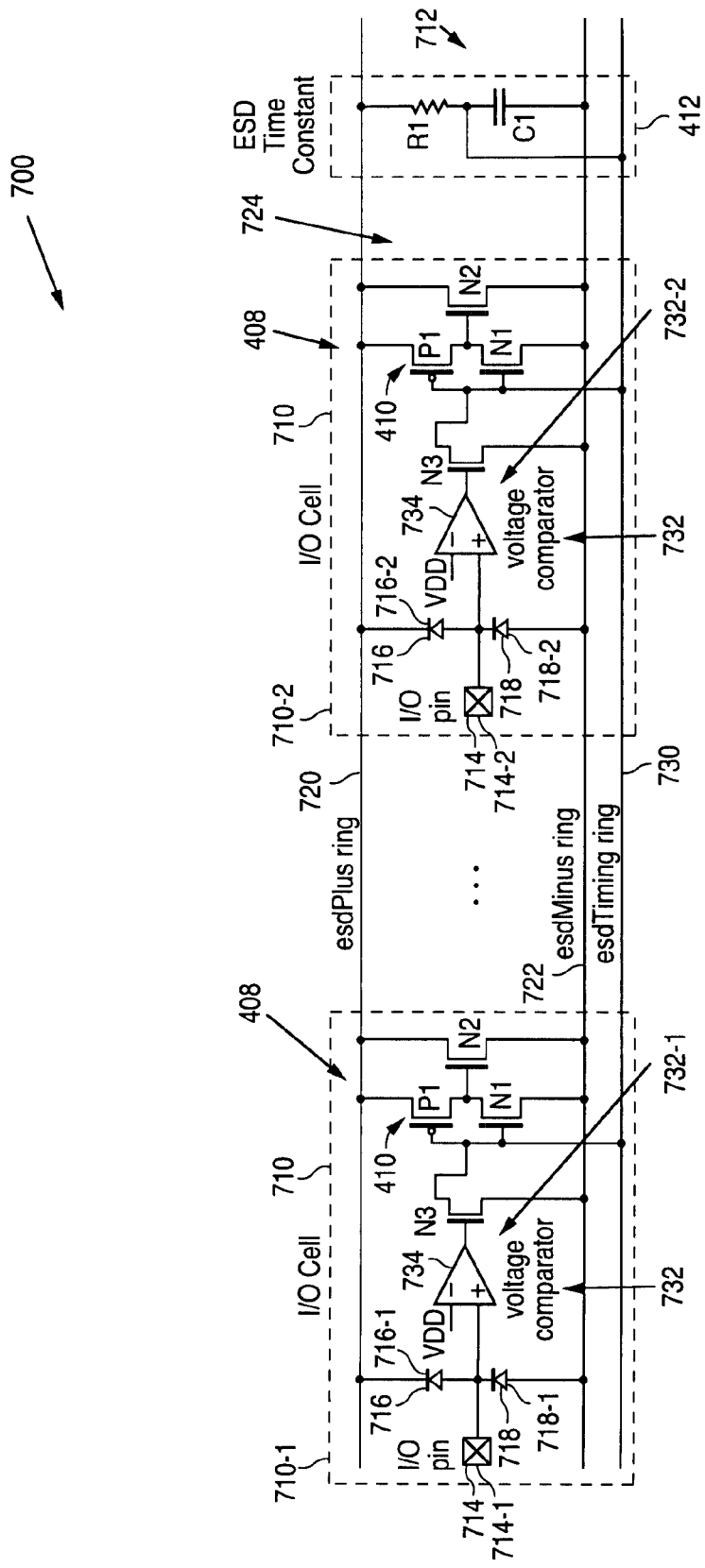
FIG. 7 is a schematic diagram illustrating an example of an electrostatic discharge (ESD) protected chip 700, in accordance with the present invention.

In accordance with the present invention, FIG. 7 shows a schematic diagram that illustrates an example of an electrostatic discharge (ESD) protected chip 700. As described in greater detail below, the present invention provides protection against an ESD event, regardless of whether the chip is powered up or powered down.

As shown in FIG. 7, chip 700 has a number of I/O cells 710, including I/O cell 710-1 and I/O cell 710-2, and an ESD protection circuit 712 that is connected to each of the I/O cells 710. Furthermore, the I/O cells 710 have a number of pins 714, including a pin 714-1 and a pin 714-2, that provide external connections to the electrical circuits within the chip. In the present example, I/O cell 710-1 has a pin 714-1, and I/O cell 710-2 has a pin 714-2.

As further shown in FIG. 7, ESD protection circuit 712 includes a number of upper ESD diodes 716, including upper ESD diodes 716-1 and 716-2, that are located within the I/O cells 710. Furthermore, the anode of each upper ESD diode 716 is connected to a pin 714. For example, the anode of upper ESD diode 716-1 is connected to pin 714-1, and the anode of upper ESD diode 716-2 is connected to pin 714-2.

In addition, ESD protection circuit 712 also includes a number of lower ESD diodes 718, including lower ESD diodes 718-1 and lower ESD diodes 718-2, that are located within the I/O cells 710. Furthermore, the cathode of each lower ESD diode 718 is connected to a pin 714. For example, the cathode of lower ESD diode 718-1 is connected to pin 714-1, and the cathode of lower ESD diode 718-2 is connected to pin 714-2.

In addition, ESD protection circuit 712 also includes an esdPlus rail 720 and an esdMinus rail 722. EsdPlus rail 720 is connected to the cathodes of the upper ESD diodes 716, and esdMinus rail 722 is connected to the anodes of the lower ESD diodes 718.

Further, ESD protection circuit 712 also includes an ESD switch circuit 724. ESD switch circuit 724 is similar to triggerswitch 400 and, as a result, utilizes the same reference numerals to designate structures that are common to both switches. Referring to FIG. 7, it can be seen that ESD switch circuit 724 is identical to triggerswitch 400, except that ESD switch circuit 724 has a transistor circuit 408 located in each I/O cell 710, and an RC time constant circuit 412 located outside of the I/O cells 710.

ESD protection circuit 712 further includes an esdTiming ring 730. As shown in FIG. 7, esdTiming ring 730 connects the R1 and C1 components of RC time constant circuit 412 to the inputs of the P1/N1 inverters 410 of the transistor circuits 408.

In accordance with the present invention, ESD protection circuit 712 also includes a number of power-on zap circuits 732, including a power-on zap circuit 732-1 and a power-on zap circuit 732-2, that are located within the I/O cells 710. For example, power-on zap circuit 732-1 is located within I/O cell 710-1, and power-on zap circuit 732-2 is located within I/O cell 710-2. Furthermore, each power-on zap circuit 732 is connected to a pin 714, a transistor circuit 408, the esdMinus ring 722, and the esdTiming ring 730.

As further shown in FIG. 7, each power-on zap circuit 732 includes an ESD voltage comparator 734, and a pull-down transistor N3. ESD voltage comparator 734 has a negative input connected to receive a power supply voltage VDD, a positive input connected to a pin 714, and an output that changes logic states when the voltage on pin 714 exceeds the power supply voltage VDD. Transistor N3, in turn, has a gate connected to the output of voltage comparator 734, a drain connected to the input of P1/N1 inverter 410, and a source connected to esdMinus rail 722.

During normal power-on chip operation, the voltages on I/O pins 714 will range between 0V (ground) and VDD. Thus, because each I/O pin 714 is connected to the positive input of an ESD voltage comparator 734, the positive input of each ESD voltage comparator 734 will also range from 0V to VDD, during normal power-on chip operation. Furthermore, because the negative input of each ESD voltage comparator 734 is connected to VDD, the output of an ESD voltage comparator 734 will remain low (0V) during normal power-on chip operation. Therefore, transistor N3 in FIG. 7 will remain off during normal power-on chip operation, which is exactly the desired circuit behavior.

At the beginning of a power-on ESD event, the positively zapped I/O pin 714 will begin to rise above VDD. When this occurs, the positive input of comparator 734, which is connected to the positively zapped I/O pin, will rise above the negative input of the same comparator. This, in turn, will cause the output of the aforementioned comparator to switch from low to high.

Referring to FIG. 7, when the output of comparator 734 switches from low to high, pull down transistor N3 will turn on, causing the capacitance on esdTiming ring 730 to quickly discharge. After esdTiming ring 730 has been discharged, esdTiming ring 730 will be in the same state that it would normally be in, immediately prior to a power-off ESD zap.

Thus, after esdTiming ring 730 has been discharged, the inputs to the P1/N1 inverters 410 inside all of the I/O cells 710 will go low, causing all of the P1/N1 inverter outputs to go high. Consequently, when all of the P1/N1 inverter outputs go high, all of the switch transistors N2 will turn on, allowing ESD current to flow from the esdPlus ring 720 to the esdMinus ring 722, through a very low resistance path. Therefore, all I/O pins 710 will be ESD protected, even though chip 700 is in a powered up state (i.e. the VDD supply voltage is present).

After a power-on ESD zap has ended, the voltage on esdMinus ring 722 will be equal to 0V (ground), the voltages on all I/O pins 714 will at their normal power-on levels (i.e. between 0V and VDD), the output voltages of all comparators 734 will be low, and all transistors N2 and N3 will be off. In addition, assuming that esdPlus ring 720 is directly connected to the power supply voltage VDD, esdPlus ring 720, esdTiming ring 730, and the ESD timing capacitor C1 will all be charged up to the power supply voltage VDD. However, if esdPlus ring 720 is connected to the power supply voltage VDD through an upper ESD diode 716, then the aforementioned circuit components will all be charged up to one diode drop below the power supply voltage VDD. In summary, after a power-on zap has ended, the ESD circuitry will be in exactly the same state that it was in, immediately prior to the power-on zap.

Figure 8:
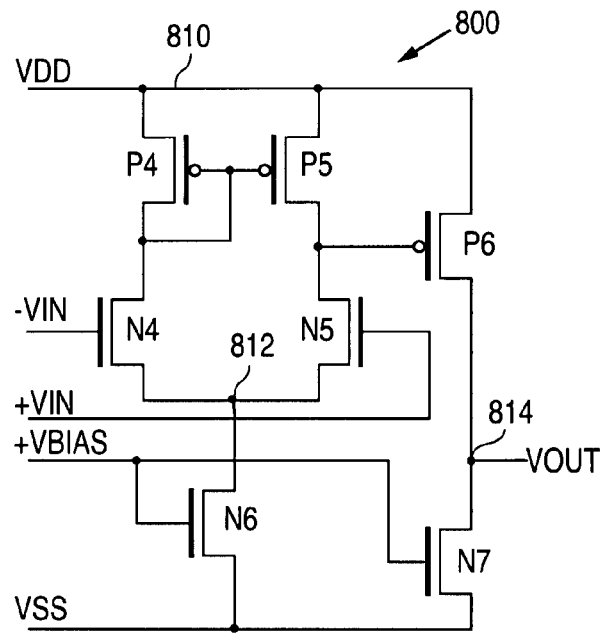
FIG. 8 is a schematic diagram illustrating a prior-art seven-transistor voltage comparator 800.

FIG. 8 shows a schematic diagram that illustrates a prior-art seven transistor voltage comparator 800. In theory, any voltage comparator, like voltage comparator 800, could potentially be used to implement an ESD voltage comparator 734 in FIG. 7. This, however, is not the case.

Referring to FIG. 8, voltage comparator 800 includes a PMOS transistor P4 and a PMOS transistor P5. PMOS transistor P4 has a gate, a source connected to a power supply line 810, and a drain that is connected to its gate. PMOS transistor P5 has a gate that is connected to the gate of PMOS transistor P4, a source connected to the power supply line 810, and a drain.

Voltage comparator 800 also includes an NMOS transistor N4 and an NMOS transistor N5. NMOS transistor N4 has a gate that serves as the negative input −VIN of comparator 800, a source connected to a common node 812, and a drain connected to the drain of PMOS transistor P4. NMOS transistor N5 has a gate that is connected to the positive input +VIN of comparator 800, a source connected to the common node 812, and a drain connected to the drain of PMOS transistor P5.

Voltage comparator 800 further includes an NMOS transistor N6, a PMOS transistor P6, and an NMOS transistor N7. NMOS transistor N6 has a gate connected to a bias input +VBIAS, a source connected to the ground line VSS, and a drain connected to the common node 812. PMOS transistor P6 has a gate connected to the drain of PMOS transistor P5, a source connected to power supply line 810, and a drain connected to an output node 814. NMOS transistor N7 has a gate connected a bias voltage input +VBIAS, a source connected to the ground line VSS, and a drain connected to the output node 814.

In normal operation, the gate of NMOS transistor N4 (the negative input of voltage comparator 800) would be connected to the power supply voltage VDD, as shown in FIG. 7. This connection allows comparator 800 to compare the VDD voltage to the voltage on its positive input +VIN. Of course, the voltage on the positive input +VIN can range from 0V to VDD during normal chip operation. Thus, when the positive input +VIN is at the VDD voltage level, voltage comparator 800 will be unable to operate properly because it will not have adequate 'headroom'. In other words, voltage comparator 800 cannot operate properly when it is trying to compare input voltages that are close to the VDD supply voltage. Because of this limitation, prior-art voltage comparator 800 cannot be used to implement ESD comparator 734.

Figure 9:
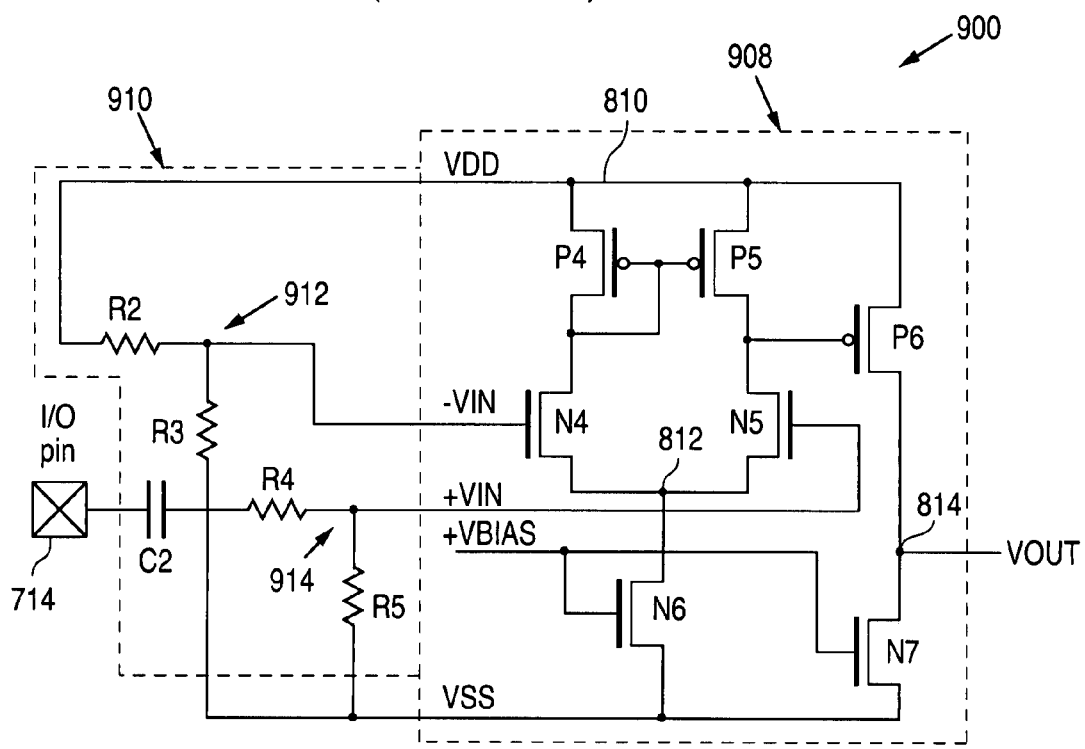
FIG. 9 is a schematic diagram illustrating an example of an ESD comparator 900, in accordance with the present invention.

In accordance with the present invention, FIG. 9 shows a schematic diagram that illustrates an example of a voltage comparator 900. Voltage comparator 900 is similar to voltage comparator 800 and, as a result, utilizes the same reference numerals to designate structures that are common to both comparators.

As shown in FIG. 9, voltage comparator 900, which can be used to implement ESD voltage comparator 734, includes a voltage comparator 908 and a modifier circuit 910, which is connected to voltage comparator 908. Voltage comparator 908, in turn, can be implemented with voltage comparator 800, which is shown in FIG. 8.

As further shown in FIG. 9, modifier circuit 910 includes a voltage divider 912, a voltage divider 914, and a capacitor C2. Voltage divider 912 includes a resistor R2 that is connected between the gate of NMOS transistor N4 (the negative input of comparator 900) and the power supply line 810. Furthermore, voltage divider 912 also includes a resistor R3 that is connected between the gate of NMOS transistor N4 (the negative input of comparator 900) and the ground line VSS.

Similarly, voltage divider 914 includes a resistor R4 that is connected between the gate of NMOS transistor N5 (the positive input of comparator 900) and a first plate of capacitor C2. Furthermore, voltage divider 914 also includes a resistor R5 that is connected between the gate of NMOS transistor N5 and the ground line VSS. The second plate of capacitor C2 is connected to an input pin, such as input pin 714, and is used to prevent a DC path to ground (VSS) from input pin 714.

In operation, resistors R2 and R3 of voltage divider 912 drop the voltage on the negative input of comparator circuit 908 to a level that is less than the power supply voltage VDD. Similarly, resistors R4 and R5 of voltage divider 914 drop the voltage on the positive input of comparator circuit 908 to a level that is also less than the power supply voltage VDD. Of course, the R2/R3 resistor ratio and the R4/R5 resistor ratio must be equal to each other.

One shortcoming of ESD comparator 900 is that it does not provide any deadband to prevent the comparator output from changing state when both comparator inputs are equal to the power supply voltage VDD. Furthermore, ESD comparator 900 consumes DC bias current that must be made high enough to allow the comparator to respond in less than a nanosecond. Thus, for chips that contain many I/O pins, the total bias current consumed by all of the comparators, in all of the I/O cells, can significantly increase the power dissipation of the chip.

Figure 10:
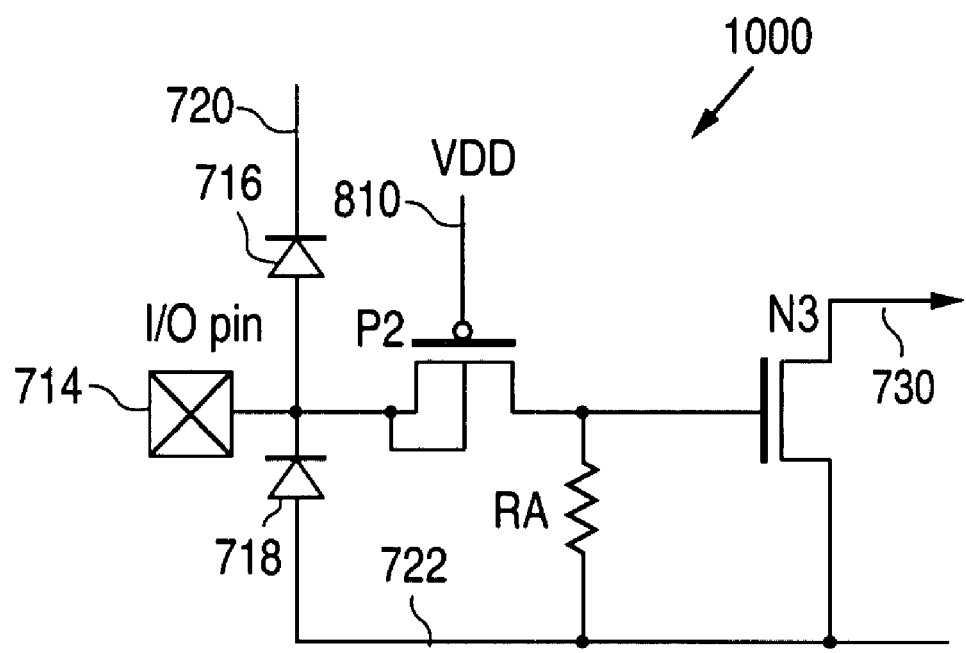
FIG. 10 is a schematic diagram illustrating an example of an ESD comparator 1000, in accordance with the present invention.

In accordance with the present invention, FIG. 10 shows a schematic diagram that illustrates an example of an ESD voltage comparator 1000. As shown in FIG. 10, ESD voltage comparator 1000 only contains two circuit components: a PMOS transistor P2 and a resistor RA. (Referring to FIG. 10, NMOS transistor N3, I/O pin 714, and ESD diodes 716 and 718 are not part of voltage comparator 1000).

As shown in FIG. 10, PMOS transistor P2 has a source and substrate that are connected to an I/O pin, such as pin 714, a drain that is connected to the gate of an NMOS pull down transistor N3, and a gate that is connected to the VDD voltage on the power supply line 810. In other words, PMOS transistor P2 is configured as a coupling device whose input (source) is connected to an I/O pin 714, and whose output (drain) drives the gate of an NMOS pull down transistor N3.

Figure 11:
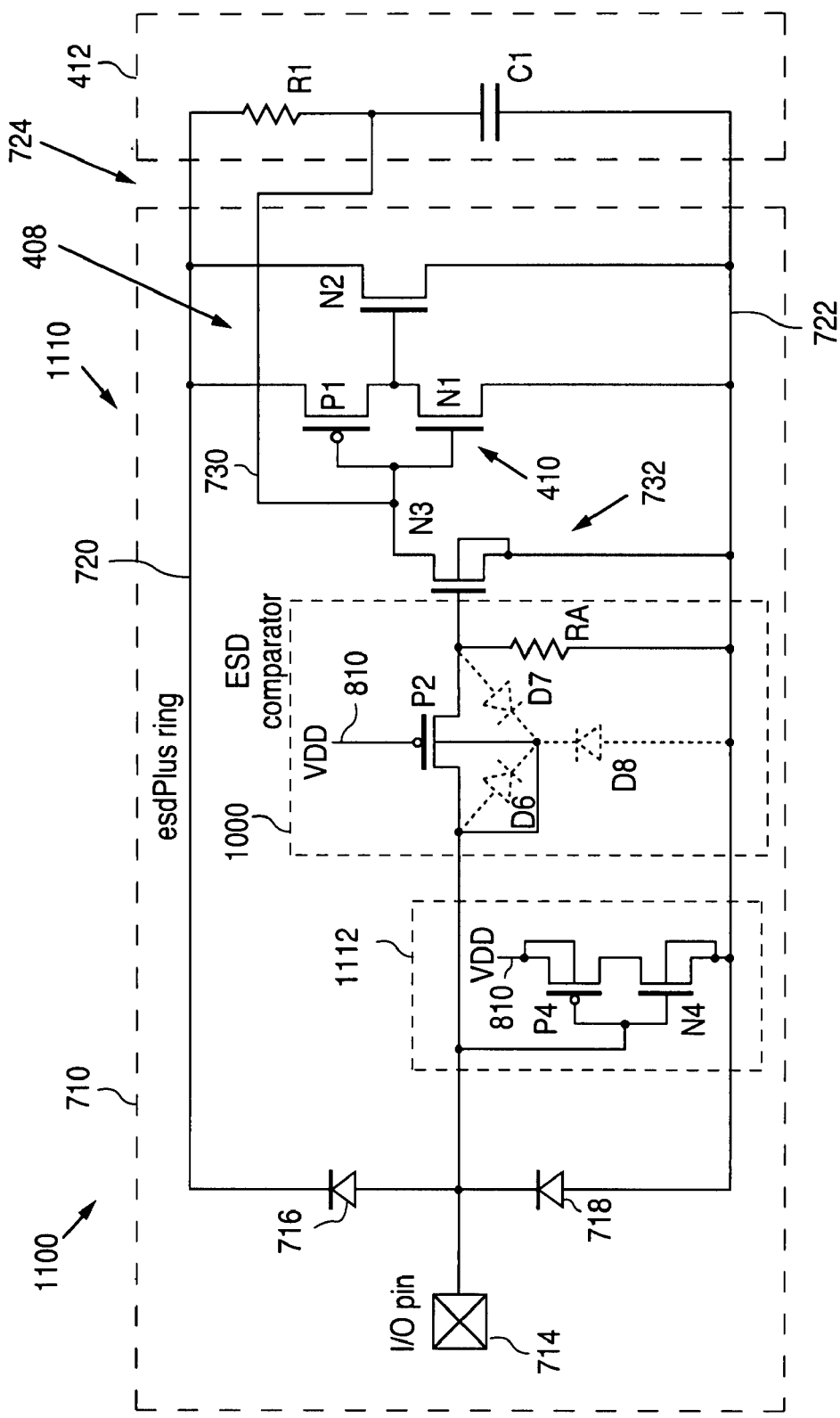
FIG. 11 is a schematic diagram illustrating an example of an ESD protected chip 1100, in accordance with the present invention.

In accordance with the present invention, FIG. 11 shows a schematic diagram that illustrates an example of an ESD protected chip 1100. ESD protected chip 1100 is similar to chip 700 and, as a result, utilizes the same reference numerals to designate structures that are common to both chips.

Chip 1100 differs from chip 700 in that chip 1100 utilizes an ESD protection circuit 1110 in lieu of ESD protection circuit 712. As shown in FIG. 11, ESD protection circuit 1110 is the same as ESD protection circuit 712, except that circuit 1110 utilizes ESD comparator 1000 to implement ESD comparator 734. In addition, for clarity, chip 1100 only illustrates a single I/O cell 710.

As further shown in FIG. 11, chip 1100 also illustrates an example of an internal gate 1112 that is being ESD protected. Referring to FIG. 11, it can be seen that ESD protected gate 1112 is an inverter, whose input is connected to I/O pin 714.

Internal gate 1112 includes a PMOS transistor P4 and an NMOS transistor N4. PMOS transistor P4 has a substrate and a source connected to the VDD power supply line 810, a gate connected to I/O pin 714, and a drain. NMOS transistor N4 has a substrate and a source connected to the ground line VSS, a gate connected to the gate of PMOS transistor P4, and a drain connected to the drain of PMOS transistor P4.

During normal power-on operation, the source of PMOS transistor P2 (i.e. I/O pin 714) can range between 0V and VDD. Thus, when the source of PMOS transistor P2 is at 0V, PMOS transistor P2 will be off because its gate-to-source voltage will be positive. In other words, PMOS transistor P2 is off because it is operating in accumulation mode.

Furthermore, during normal power-on chip operation, when the source of PMOS transistor P2 is at the VDD voltage level, PMOS transistor P2 will still remain off because its gate-to-source voltage will be equal to 0V. Thus, in summary, PMOS transistor P2 will remain off during normal chip operation, independent of the voltage level that is present on the source of PMOS transistor P2.

As shown in FIG. 11, resistor RA is connected from ground to the drain of PMOS transistor P2 and the gate of NMOS transistor N3. The purpose of resistor RA is to ensure that NMOS transistor N3 will remain off during normal power-on chip operation. In other words, since PMOS transistor P2 will be off during normal power-on chip operation, resistor RA will force the gate-to-source voltage of NMOS transistor N3 to be 0V, ensuring that NMOS transistor N3 remains off.

The value of resistor RA can have a very wide range, as long as the value causes NMOS transistor N3 to remain off during normal power-on chip operation. Therefore, the maximum value of resistor RA can be computed by simply dividing the minimum threshold voltage of NMOS transistor N3 by the maximum leakage current at the drain of PMOS transistor P2. For example, the chosen value of resistor RA can easily range from a few Kohms to over 100K. (In terms of minimizing chip area, a few Kohms is preferable).

When I/O pin 714 in FIG. 11 is positively zapped, the increased positive voltage on pin 714 will force the gate-to-source voltage of PMOS transistor P2 to become negative, thereby turning on the transistor. Furthermore, when PMOS transistor P2 turns on, it will turn on NMOS pulldown transistor N3, thereby discharging the capacitance on esdTiming ring 730. In other words, esdTiming ring 730 will be quickly pulled to ground.

When esdTiming ring 730 is pulled to ground, it will cause the voltage input to P1/N1 inverter 410 to fall to ground, allowing the inverter to turn on. Moreover, when P1/N1 inverter 410 turns on, its output will go from low to high, turning on NMOS switch transistor N2. Consequently, when NMOS switch transistor N2 turns on, it will effectively short (connect) esdPlus ring 720 to esdMinus ring 722.

Of course, when esdTiming ring 730 becomes discharged at the beginning of a power-on ESD zap, all of the switch transistors N2, in all of the I/O cells 710 will turn on, thereby providing multiple parallel current paths for the ESD current. These multiple parallel current paths provide a very low resistance from esdPlus ring 720 to esdMinus ring 722, allowing the ESD current to flow from a positively zapped I/O pin 714 to a negatively zapped I/O pin 714.

It is important to note that the discharge of esdTiming ring 730 is caused by turning on a single NMOS pulldown transistor N3. In other words, when esdTiming ring 730 is being discharged, it is being discharged through only a single NMOS pull down transistor N3, which is located inside of the I/O cell 710 that is being positively zapped. Therefore, all of the N2 switch transistors, located in all of the I/O cells 710, will get turned on because a single NMOS pull down transistor N3 has discharged esdTiming ring 730.

FIG. 11 shows the parasitic diodes that are present on the source, drain and substrate of PMOS transistor P2. (These parasitic diodes are drawn as dashed lines in FIG. 11). Referring to FIG. 11, parasitic diode D6 is the parasitic source to Nwell diode, parasitic diode D7 is the parasitic drain to Nwell diode, and parasitic diode D8 is the parasitic Nwell to P-substrate diode.

As shown in FIG. 11, the parasitic source to Nwell diode D6 is shorted out because the Nwell (substrate) of PMOS transistor P2 is connected to the source terminal of PMOS transistor P2. This is the 'normal' connection for most PMOS devices, except that the source/Nwell terminals of transistor P2 are connected to I/O pin 714, instead of being connected to the power supply voltage VDD.

Furthermore, because the gate of PMOS transistor P2 is connected to the power supply voltage VDD, PMOS transistor P2 cannot turn on during normal chip operation because its gate-to-source voltage cannot become negative during normal chip operation. Therefore, the only way that PMOS transistor P2 can turn on is when its gate-to-source voltage becomes negative, and this can only occur during an ESD event.

As an additional circuit feature, transistor P2 cannot turn on until its gate-to-source voltage is greater than its threshold voltage, thereby providing a built-in deadband. This deadband prevents ESD voltage comparator 1000 from inadvertently changing state during normal chip operation. Furthermore, none of the parasitic diodes in FIG. 11 can become forward biased during normal chip operation, or during an ESD event. Thus transistor latchup is not a problem.

In addition to providing protection to a positively zapped I/O pin, ESD protection circuit 1110 must also protect a negatively zapped I/O pin. Referring to FIG. 11, the peak voltage at a negatively zapped I/O pin will be equal to the negative voltage −VIN. Thus, for PMOS transistor P2, the magnitude of the peak gate-to-substrate voltage and the magnitude of the peak gate-to-source voltage will be equal to VDD+VIN. Similarly, for protected PMOS transistor P4, the magnitude of the peak gate-to-substrate voltage and the magnitude of the peak gate-to-source voltage will also be equal to VDD+VIN.

Because the magnitude of the peak gate-to-substrate voltages for PMOS transistors P2 and P4 are both equal to VDD+VIN, during an ESD event the quantity VDD+VIN must not exceed the peak transient voltage allowed across the gate oxide. Nevertheless, this requirement can always be satisfied by making the lower ESD diode 718 adequate in size, so that the voltage −VIN will not become too negative.

For example, for a 0.13 u process, the peak transient voltage allowed across the gate oxide, during an ESD event, is approximately 4V. Since VDD is nominally 2.5V, the peak magnitude of VIN must be less than or equal to 1.5V (4V−2.5V). In other words, for the present example, the peak transient voltage at a negatively zapped I/O pin must not be more negative than −1.5V.

Referring to FIG. 11, it can be seen that PMOS transistors P2 and P4 see the same peak gate-to-substrate voltage (VDD+VIN) during an ESD event, even though they are connected differently. In other words, PMOS transistor P2 has its gate and substrate connected to VDD, while PMOS transistor P4 has its substrate and source connected to VDD.

Figure 12:
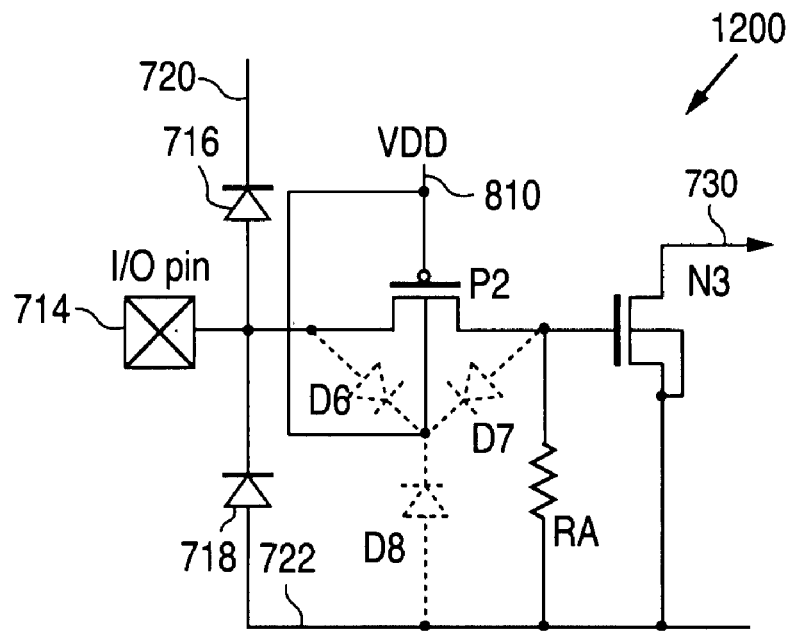
FIG. 12 is a schematic diagram illustrating an example of an ESD an comparator 1200, in accordance with the present invention.
Figure 13:
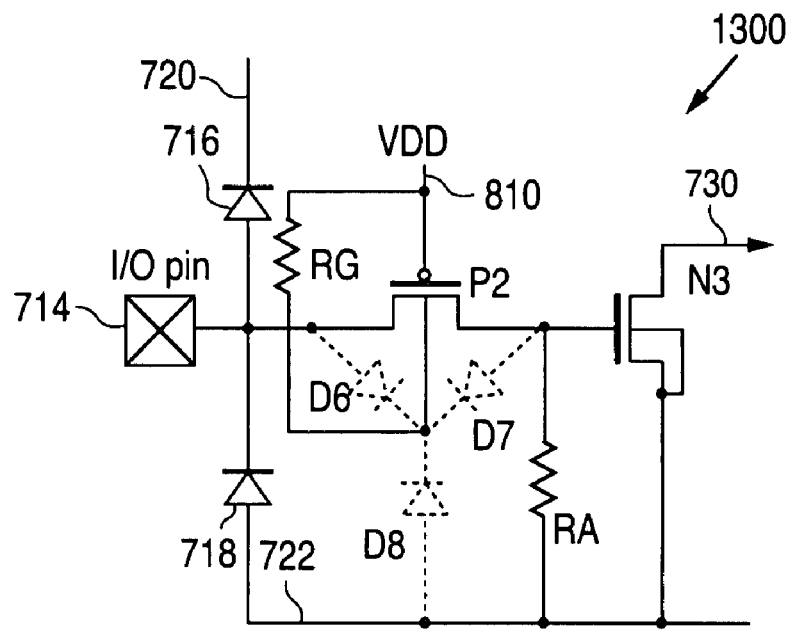
FIG. 13 is a schematic diagram illustrating an example of an ESD comparator 1300, in accordance with the present invention.

FIG. 12 shows a schematic diagram that illustrates an example of an ESD comparator 1200, in accordance with the present invention. In addition, FIG. 13 shows a schematic diagram that illustrates another example of an ESD comparator 1300, in accordance with the present invention. ESD comparators 1200 and 1300 are similar to ESD comparator 1000 and, as a result, utilize the same reference numerals to designate structures that are common to both comparators.

Comparing FIG. 12 to FIG. 10, it can be seen that ESD comparator 1200 is the same as ESD comparator 1000, except for the substrate connection of PMOS transistor P2. In other words, in FIG. 12 the substrate of PMOS transistor P2 is connected to the VDD power supply line 810, but in FIG. 1000 the substrate of PMOS transistor P2 is connected to I/O pin 714.

Connecting the substrate of PMOS transistor P2 to the power supply voltage VDD, instead of to I/O pin 714, has advantages and disadvantages. The main advantage is that the capacitance on I/O pin 714 will be reduced because parasitic diode D8, the parasitic Nwell to P-substrate diode, will no longer be connected to I/O pin 714. Generally speaking, this alternate connection should only be used when the I/O pin capacitance must be kept to an absolute minimum.

The disadvantage of connecting the substrate of PMOS transistor P2 to the power supply voltage VDD is that the parasitic source-to-substrate diode D6 will become forward biased during a power-on ESD event. This occurs because, during a power-on ESD event, the anode of parasitic diode D6 can reach a higher voltage than the cathode of parasitic diode D6, which is connected to the power supply voltage VDD. However, during normal power-on chip operation, parasitic diode D6 cannot become forward biased because its anode cannot go to a higher voltage than its cathode.

In order to turn on PMOS transistor P2 during a power-on ESD event, the I/O pin voltage only has to go a small amount above the power supply voltage VDD. When this occurs, and if PMOS transistor P2 is not made too large, the forward resistance of parasitic diode D6 may be high enough to limit the forward current through parasitic diode D6 to a safe value. If this is not the case, a current limiting resistor RG can be connected from the P2 substrate to power supply voltage VDD, as shown in FIG. 13.

Furthermore, when the P2 substrate is connected to the power supply voltage VDD and the parasitic diode D6 becomes forward biased during a power-on ESD event, it becomes possible for latchup to occur. Thus, in order to prevent latchup, the guard rings and diffusions close to PMOS transistor P2 must be carefully positioned. Of course, if latchup does occur during a power-on ESD event, the chip will not function correctly after the event has ended, and the chip can even become permanently damaged.

Figure 14:
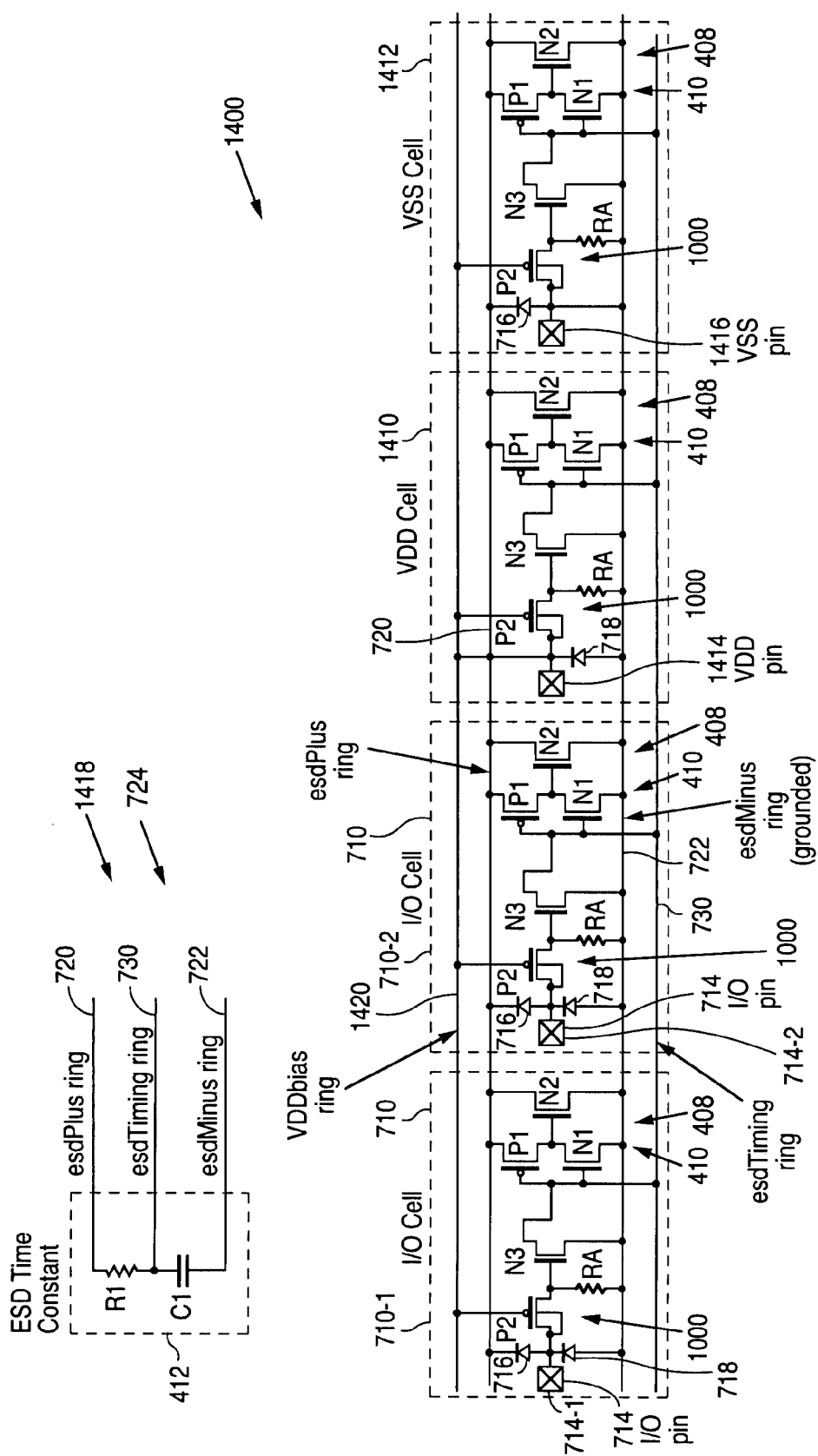
FIG. 14 is a schematic diagram illustrating an example of an ESD protected chip 1400, in accordance with the present invention.

In accordance with the present invention, FIG. 14 shows a schematic diagram that illustrates an example of an ESD protected chip 1400. Chip 1400 is similar to chip 1100 and, as a result, utilizes the same reference numerals to designate structures that are common to both chips.

Chip 1400 differs from chip 1100 in that chip 1400 utilizes an ESD protection circuit 1418 in lieu of ESD protection circuit 1110. Furthermore, chip 1400 illustrates two I/O cells 710-1 and 710-2, and chip 1400 also includes a VDD cell 1410 and a VSS cell 1412. In addition, VDD cell 1410 has a VDD pin 1414, and VSS cell 1412 has a VSS pin 1416.

As shown in FIG. 14, ESD protection circuit 1418 is the same as ESD protection circuit 1110, with the components located in the I/O cells 710, the VDD cell 1410, and the VSS cell 1412 being the same, except that the upper ESD diode 716 in VDD cell 1410 has been replaced by a direct (shorted) connection from a VDD pin 1414 to esdPlus ring 720. In addition, again referring to FIG. 14, the lower ESD diode 718 in VSS cell 1412 has been replaced by a direct (shorted) connection from a VSS pin 1416 to the grounded VSS ring 722.

Furthermore, ESD protection circuit 1418 also illustrates a VDDbias ring 1420. VDDbias ring 1420 provides the gate bias voltage required by the P2 PMOS transistors in all of the I/O cells 710, all of the VDD cells 1410, and all of the VSS cells 1412. In those chips where the VDD bias voltage is directly provided to each I/O cell 710 directly from the chip core, VDDbias ring 1420 will not be required. In addition, for clarity, the protected transistors 1112 of FIG. 11 are not shown.

Referring to FIG. 14, if the two I/O cells 710-1 and 710-2 are zapped, the NMOS pull down transistor N3 in the positively zapped I/O cell 710-1 will turn on, causing esdTiming ring 730 to be quickly discharged to ground. This, in turn, will cause the NMOS switch transistors N2 in all of the I/O cells 710, all of the VDD cells 1410, and all of the VSS cells 1412 to also turn on, effectively shorting esdPlus ring 720 to grounded esdMinus ring 722. Due to this shorting, the VDD power supply pin 1414 will also be shorted to ground because VDD pin 1414 is directly connected to esdPlus ring 720.

Of course, this VDD power supply shorting will occur for only a few nanoseconds during an ESD event. Therefore, many power supplies (especially those that have current limiting protection and current foldback protection) will be able to easily withstand this shorting without sustaining any damage. Furthermore, since the power supply shorting only occurs for a few nanoseconds, in many cases a large portion of the short circuit current will be provided by the charged up capacitors that are connected to the power supply output. Therefore, in many applications, briefly shorting out the VDD power supply during a power-on ESD event is permissible.

Nevertheless, there are applications in which it is not permissible to briefly short out the VDD power supply during a power-on ESD event. For example, when an ESD protected chip shares the same VDD power supply with other components on the same circuit board, briefly shorting out the power supply may cause the other components to misbehave, possibly causing a system malfunction. Therefore, it is highly desirable to provide a means for avoiding VDD power supply shorting during a power-on ESD event.

Figure 15:
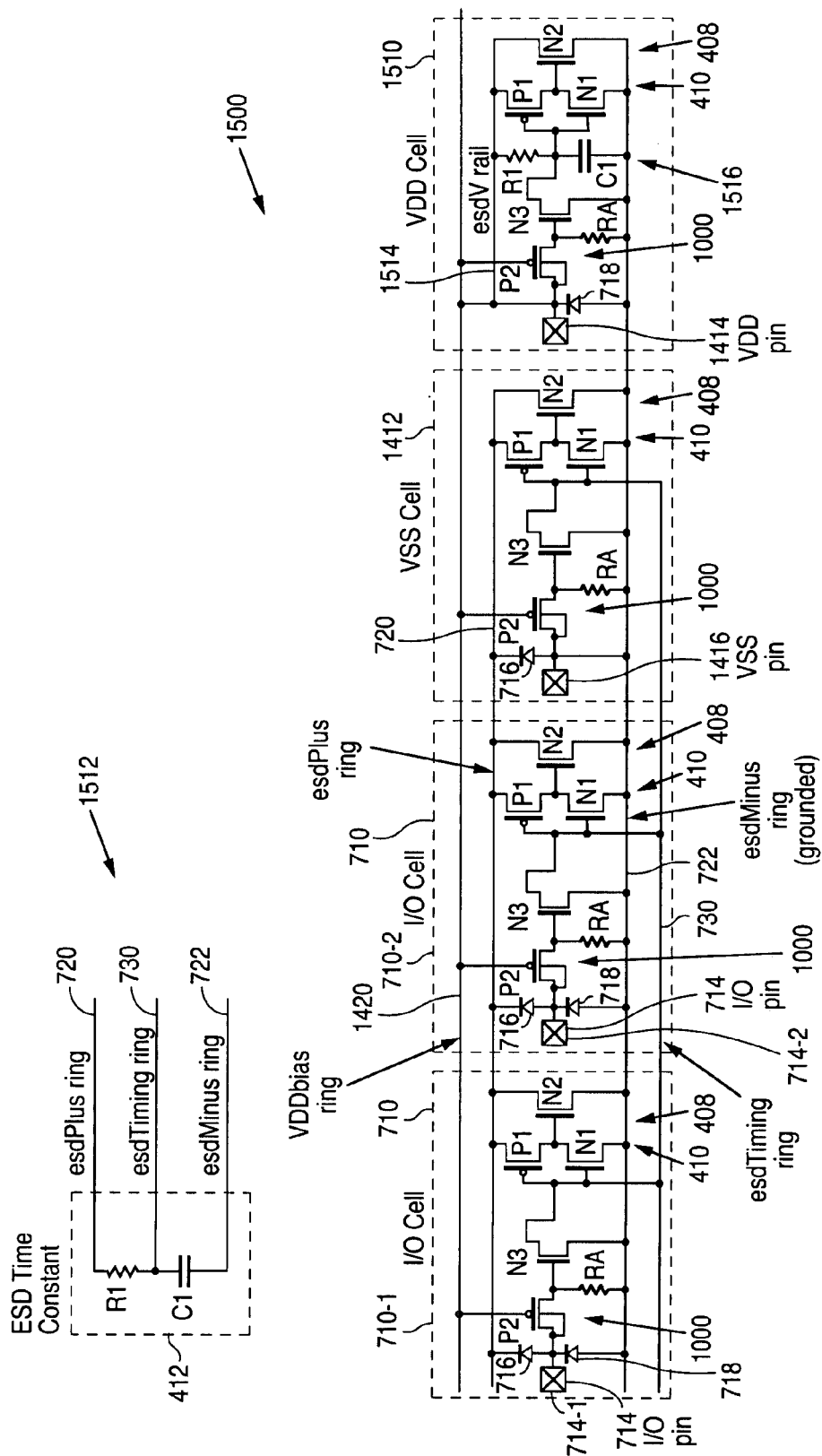
FIG. 15 is a schematic diagram illustrating an example of an ESD protected chip 1500, in accordance with the present invention.

In accordance with the present invention, FIG. 15 shows a schematic diagram that illustrates an example of an ESD protected chip 1500. Chip 1500 is similar to chip 1400 and, as a result, utilizes the same reference numerals to designate structures that are common to both chips.

Chip 1500 differs from chip 1400 in that chip 1500 utilizes an ESD protection circuit 1512, in lieu of ESD protection circuit 1418. Furthermore, chip 1500 also differs from chip 1400 in that chip 1500 includes a VDD cell 1510, in lieu of VDD cell 1410. The components of ESD protection circuit 1418 that lie within VDD cell 1510 are similar to the components that lie within VDD cell 1410 and, as a result, utilizes the same reference numerals to designate the structures which are common to both VDD cells.

As shown in FIG. 15, ESD protection circuit 1512 includes an isolated esdV rail 1514 and an RC time constant circuit 1516 that are located in VDD cell 1510. RC time constant circuit 1516 is connected between the isolated esdV rail 1514 and the grounded esdMinus ring.

Referring to FIG. 15, the VDD pin 1414 of VDD cell 1510 is not connected to esdPlus ring 720, but is instead connected to the isolated esdV rail 1514. This connection prevents the VDD power supply from being shorted out whenever any two non-VDD pins are subjected to a power-on ESD zap.

Referring to FIG. 15, the ESD circuitry inside of VDD cell 1510 is not connected to esdTiming ring 730, which is shared by all of the other I/O cells 710, and all of the VSS cells 1412. Instead, the ESD circuitry inside of VDD cell 1510 generates its own time constant, using its own internal R1*C1 components in circuit 1516. Therefore, VDD cell 1510 prevents the VDD power supply from being shorted out whenever two non-VDD cells are subjected to a power-on zap.

Referring to FIG. 15, if VDD pin 1414 is zapped positive, two different ESD scenarios are possible. In the first scenario, the VDD power supply (including the VDD output capacitors) will be able to absorb the ESD current jolt, without significantly raising the voltage on VDD pin 1414. In this case, the ESD circuit will not be activated because the VDD voltage has not significantly increased. In other words, the power supply (including the VDD output capacitors) have effectively absorbed the ESD current jolt, preventing a power-on ESD event from occurring on VDD pin 1414.

In the second ESD scenario, the VDD power supply (including the VDD output capacitors) will be unable to absorb the ESD current jolt and the voltage on VDD pin 1414 will be raised high enough to cause a power-on ESD event. In this case, the NMOS transistor switch N2 (which is located inside of VDD cell 1510) will turn on, providing a 'normal' discharge path for the ESD current. Of course, in this case the VDD power supply will be briefly shorted out.

Referring to FIG. 15, if VDD pin 1414 is zapped negative, the switch transistor N2 (located inside of VDD cell 1510) will not turn on, and ESD current will simply flow through the lower ESD diode 718 that is located inside of VDD cell 1510, and/or through the VDD power supply itself. (In the ESD current path, these components are connected in parallel. However, as described above, most active power supplies will not be able to sink the ESD current).

Referring to FIG. 15, NMOS transistor switch N2, which is located inside of VDD cell 1510, must be made large enough to conduct all of the power-on zap current. The reason for this is that when VDD pin 1414 is zapped positive, none of the transistor switches N2 (located inside of the non-VDD cells) will turn on. Therefore, transistor switch N2, which is located inside of VDD cell 1510, must conduct all of the power-on zap current.

Although the ESD protection circuitry shown in FIG. 15 can protect VDD pin 1414 from a positive or negative power-on zap, in most applications VDD pin 1414 is not likely to be directly zapped while VDD power is on. This is true because, when VDD power is on, the VDD pin is relatively inaccessible to human hands, in comparison to other I/O pins that must drive long system cables or backplanes. In other words, it is not very likely that the VDD power supply pin 1414 will be shorted out during a power-on ESD zap.

Of course, when VDD power is off, all pins, including VDD, are equally likely to be zapped. This is true because, in most power-off ESD scenarios, the chip has not yet been connected to a PCB. Therefore, the VDD pin must be protected against power-off ESD zaps, just like all of the other I/O pins 714 and VSS pins 1416.

When a chip has two or more power supply pins that have different VDD voltages (i.e. supply voltage VDD1 and supply voltage VDD2), the ESD circuitry for the different power supply pins can be isolated from the shared esdPlus ring 720, and from the shared esdTiming ring 730. This can be accomplished using two different isolation methods, as follows.

Figure 16:
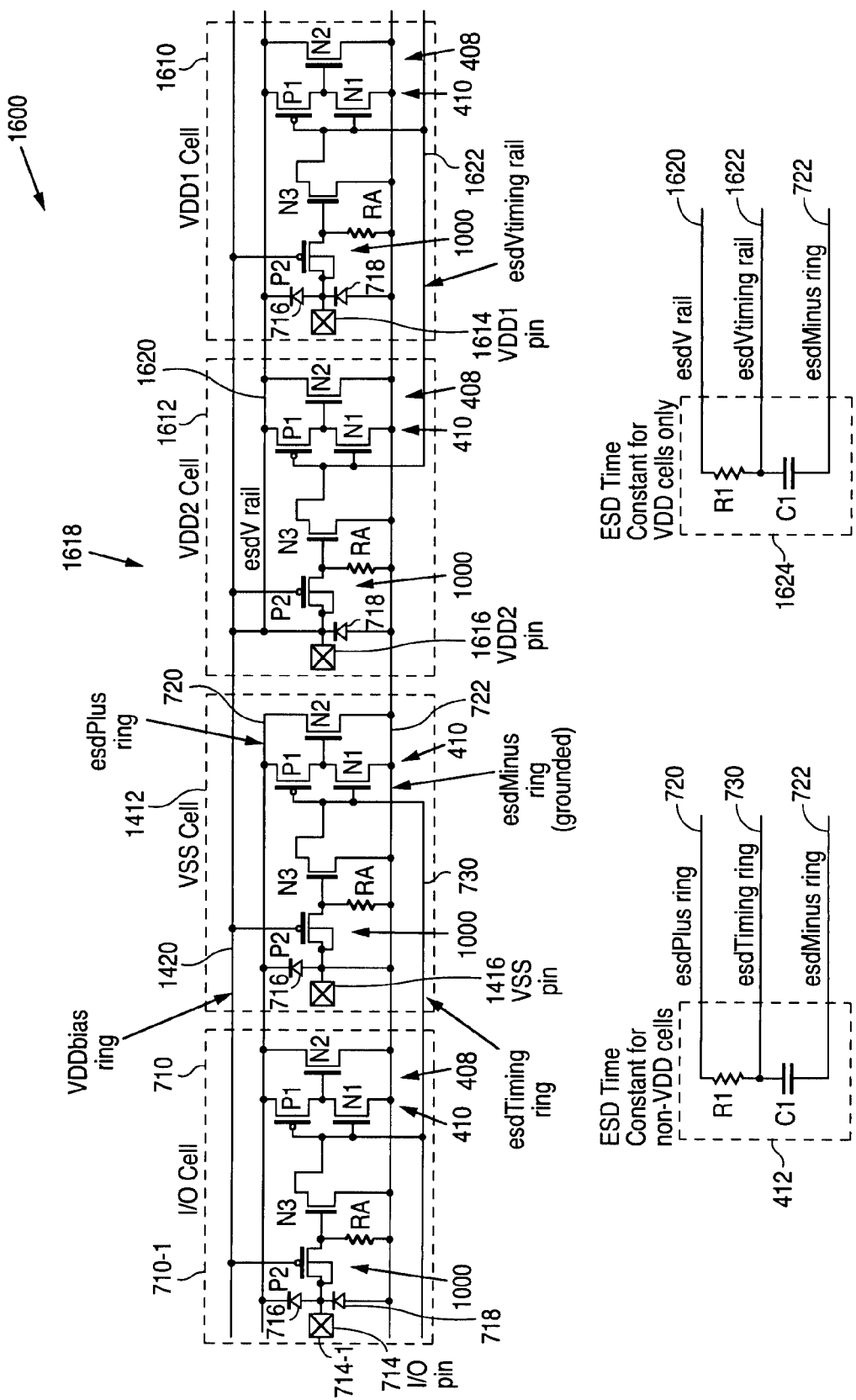
FIG. 16 is a schematic diagram illustrating an example of an ESD protected chip 1600, in accordance with the present invention.

In accordance with the present invention, FIG. 16 shows a schematic diagram that illustrates an example of an ESD protected chip 1600. Chip 1600 is similar to chip 1400 and, as a result, utilizes the same reference numerals to designate structures that are common to both chips.

Chip 1600 differs from chip 1400 in that chip 1600 illustrates a single I/O cell 710 (for clarity purposes only), and a first VDD cell 1610 and a second VDD cell 1612, in lieu of VDD cell 1410. First VDD cell 1610 has a VDD1 pin 1614, and second VDD cell 1612 has a VDD2 pin 1616. (For illustration purposes, it is assumed that voltage VDD2 is greater than voltage VDD1.)

Chip 1600 also differs from chip 1400 in that chip 1600 utilizes an ESD protection circuit 1618, in lieu of ESD protection circuit 1418. The components of ESD protection circuit 1618 that lie within VDD cells 1610 and 1612 are similar to the components that lie within VDD cell 1410 and, as a result, utilizes the same reference numerals to designate the structures which are common to the VDD cells.

Thus, as shown in FIG. 16, ESD protection circuit 1618 is the same as ESD protection circuit 1418, except that ESD protection circuit 1618 also includes an esdV rail 1620, an esdVTiming rail 1622, and an RC time constant circuit 1624, which is connected between esdV rail 1620 and the grounded esdMinus ring 722. Furthermore, pins 1614 and 1616, which are located inside of VDD cells 1610 and 1612 respectively, are isolated from esdPlus ring 720.

Furthermore, pin 1616 is directly connected to esdV rail 1620, and pin 1614 is indirectly connected to esdV rail 1620, via upper ESD diode 716. Similarly, NMOS transistors N3 and P1/N1 inverters 410, which are located inside of VDD cells 1610 and 1612, are isolated from esdTiming ring 730, and are instead connected to esdVTiming rail 1622.

In addition, the highest VDD voltage (VDD2 in the FIG. 16 example) is directly connected to esdV rail 1620, and to VDDbias rail 1420, which supplies VDD bias voltage to the gate terminals of all P2 PMOS transistors.

As shown in FIG. 16, the VDD cell group (VDD cells 1610 and 1612 in the FIG. 16 example) has its own R1/C1 timing components, which are located inside of the shared RC time constant circuit 1624. Furthermore, the cell group consisting of all non-VDD cells (I/O cells 710 and VSS cells 1412 in the FIG. 16 example) also has its own R1/C1 timing components, which are located inside of the shared RC time constant circuit 412.

Referring to FIG. 16, the main advantage of this isolation method is that only a single R1/C1 time constant is required for all of the VDD cells that are connected to the same esdV rail. Of course, for the circuit shown in FIG. 16, the NMOS switch transistors N2, in all of the VDD cells, must be jointly capable of conducting the total ESD current.

The main disadvantage of the above isolation method is that, if a power-on ESD event does occur when one of the VDD pins is zapped positive, all of the VDD pins that are connected to the same esdV rail will be briefly shorted to ground. (As previously noted above, a power-on ESD event may not always occur when a powered up VDD pin is zapped positive. Furthermore, briefly shorting out the VDD power supply pins may or may not be a problem, depending upon the system requirements. In addition, it is not likely that the VDD power supply pins will be directly subjected to a power-on ESD zap).

Another disadvantage of the above isolation method is that all of the VDD pins (pin 1614 and pin 1616 in the FIG. 16 example) might have to be located next to each other, so that they can be easily connected to the same wide (low resistance) esdV rail. However, if many levels of ESD metal interconnect are available, and if the ESD zap current is not extremely high, the VDD cells might not have to be located next to each other.

In other words, if extremely low ESD ring resistance is not required, esdPlus ring 720 may not have to utilize the uppermost metal layers, allowing esdV rail 1620 to utilize these layers. In this case, esdV rail 1620 can be physically constructed as an esdV ring, just like esdPlus ring 720. Moreover, the two rings can be physically located over/under each other in the same layout track, decreasing the chip size.

Figure 17:
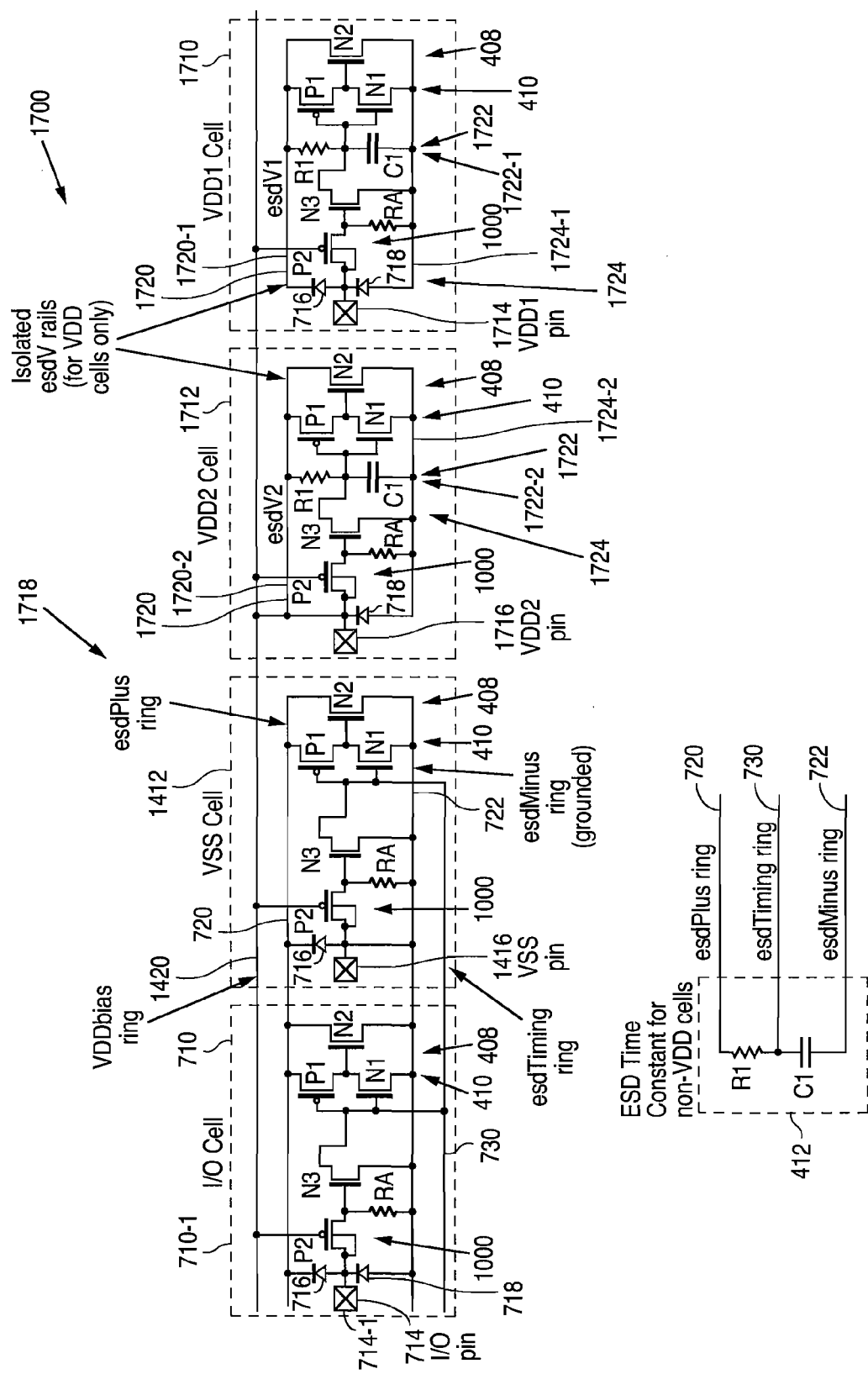
FIG. 17 is a schematic diagram illustrating an example of an ESD protected chip 1700, in accordance with the present invention.

In accordance with the present invention, FIG. 17 shows a schematic diagram that illustrates an example of an ESD protected chip 1700. Chip 1700 is similar to chip 1600 and, as a result, utilizes the same reference numerals to designate structures that are common to both chips.

Chip 1700 differs from chip 1400 in that chip 1600 illustrates a single I/O cell 710 (for clarity purposes only), and a first VDD cell 1710 and a second VDD cell 1712, in lieu of VDD cell 1410. First VDD cell 1710 has a VDD1 pin 1714, and second VDD cell 1712 has a VDD2 pin 1716. (For illustration purposes, it is assumed that voltage VDD2 is greater than voltage VDD1.)

Chip 1700 also differs from chip 1400 in that chip 1700 utilizes an ESD protection circuit 1718, in lieu of ESD protection circuit 1418. The components of ESD protection circuit 1718 that lie within VDD cells 1710 and 1712 are similar to the components that lie within VDD cell 1410 and, as a result, utilize the same reference numerals to designate the structures which are common to the VDD cells.

As shown in FIG. 17, ESD protection circuit 1718 is the same as ESD protection circuit 1418, except that ESD protection circuit 1718 utilizes a number of esdV rails 1720, including esdV rails 1720-1 and 1720-2, a number of ESD time constant circuits 1722, including ESD time constant circuits 1722-1 and 1722-2, and a number of minus rails 1724, including minus rail 1724-1 and 1724-2.

As shown in FIG. 17, pin 1714 is isolated from esdPlus ring 720, and is instead indirectly connected to esdV rail 1720-1, via the upper ESD diode 716. Similarly, pin 1716 is also isolated from esdPlus ring 720, and is directly connected to esdV rail 1720-2. Furthermore, NMOS transistor N3 and P1/N1 inverter 410 in VDD cell 1710 are isolated from esdTiming rail 730, and are instead connected to ESD time constant circuit 1722-1. Similarly, NMOS transistor N3 and P1/N1 inverter 410 in VDD cell 1712 are also isolated from esdTiming rail 730, and are connected to ESD time constant circuit 1722-2.

The main advantage of the above ESD protection circuit is that the VDD pins do not have to be located next to each other because each VDD pin has its own isolated esdV rail (1720-1 and 1720-2 in the above example) and its own R1*C1 timing components (1722-1 and 1722-2 in the above example). On the other hand, the main disadvantage of this isolation method is that it occupies more chip area because each VDD cell must have its own switch transistor N2, and its own R1*C1 timing components. Furthermore, as described above, each NMOS switch transistor N2 in each VDD cell (1710 and 1712 in the above example) must be capable of conducting the total ESD current.

Figure 18:
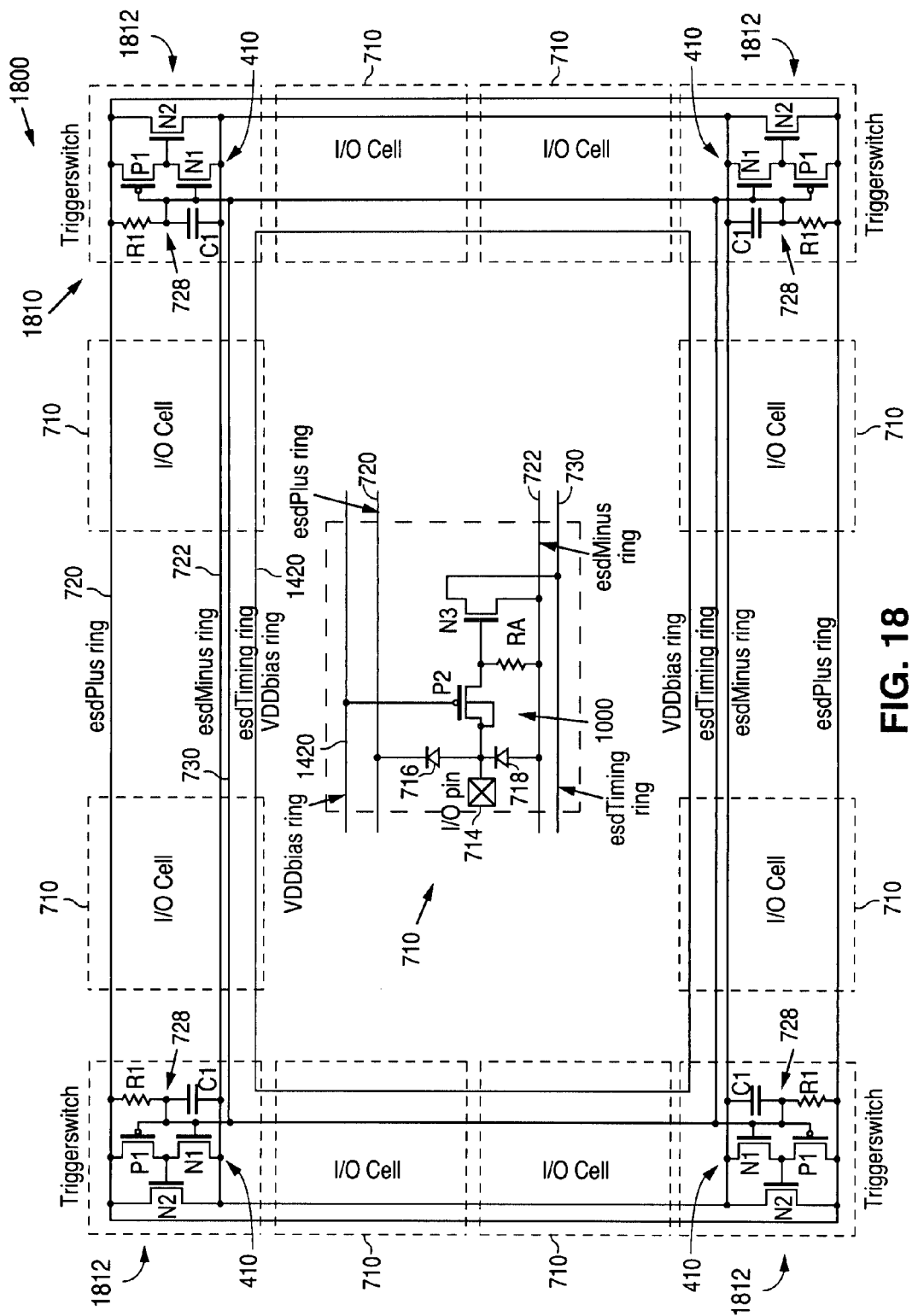
FIG. 18 is a schematic diagram illustrating an example of an ESD protected chip 1800, in accordance with the present invention.

In accordance with the present invention, FIG. 18 shows a schematic diagram that illustrates an example of an ESD protected chip 1800. ESD protected chip 1800 is similar to chip 1400 and, as a result, utilizes the same reference numerals to designate the structures which are common to both chips.

ESD protected chip 1800 differs from chip 1400 in that chip 1800 utilizes an ESD protection circuit 1810, in lieu of ESD protection circuit 1418. As shown in FIG. 18, ESD protection circuit 1810 is the same as ESD protection circuit 1418, except that ESD protection circuit 1810 utilizes four triggerswitches 1812 in lieu of switch circuit 724.

Figure 1A:
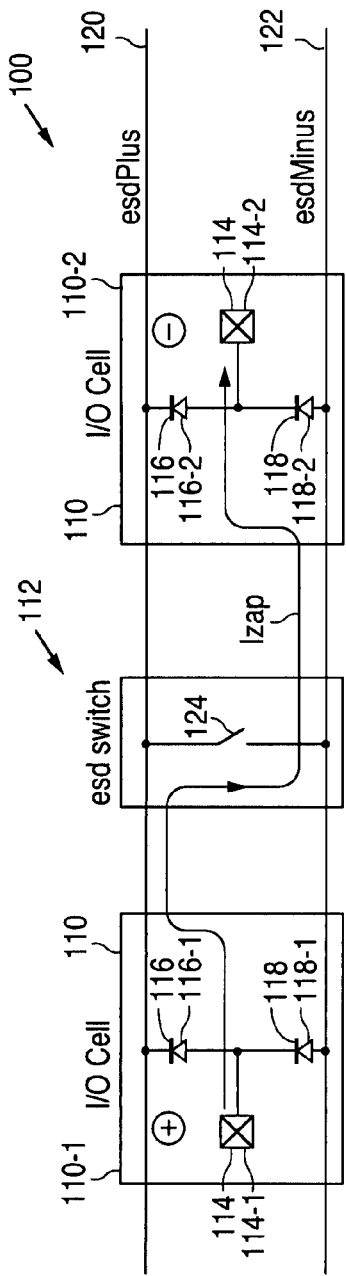
FIGS. 1A-1B are schematic diagrams illustrating a prior-art ESD protected chip 100.
Figure 1B:
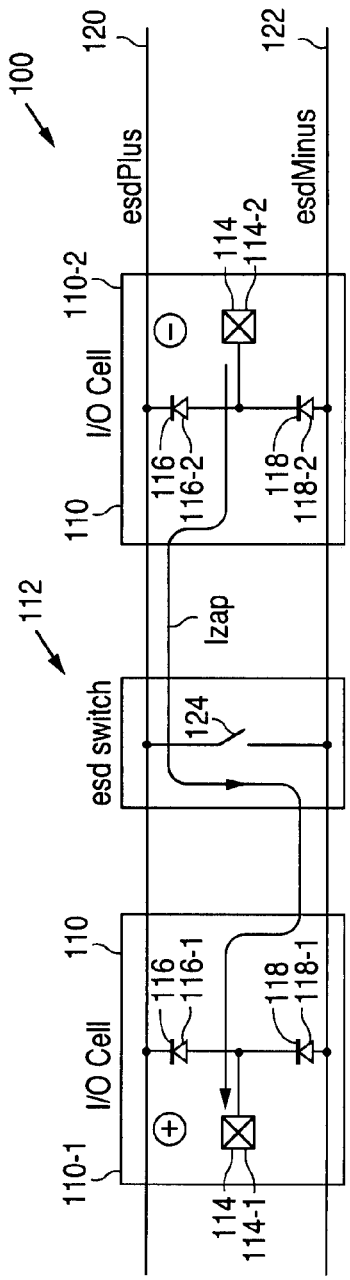
Figure 2:
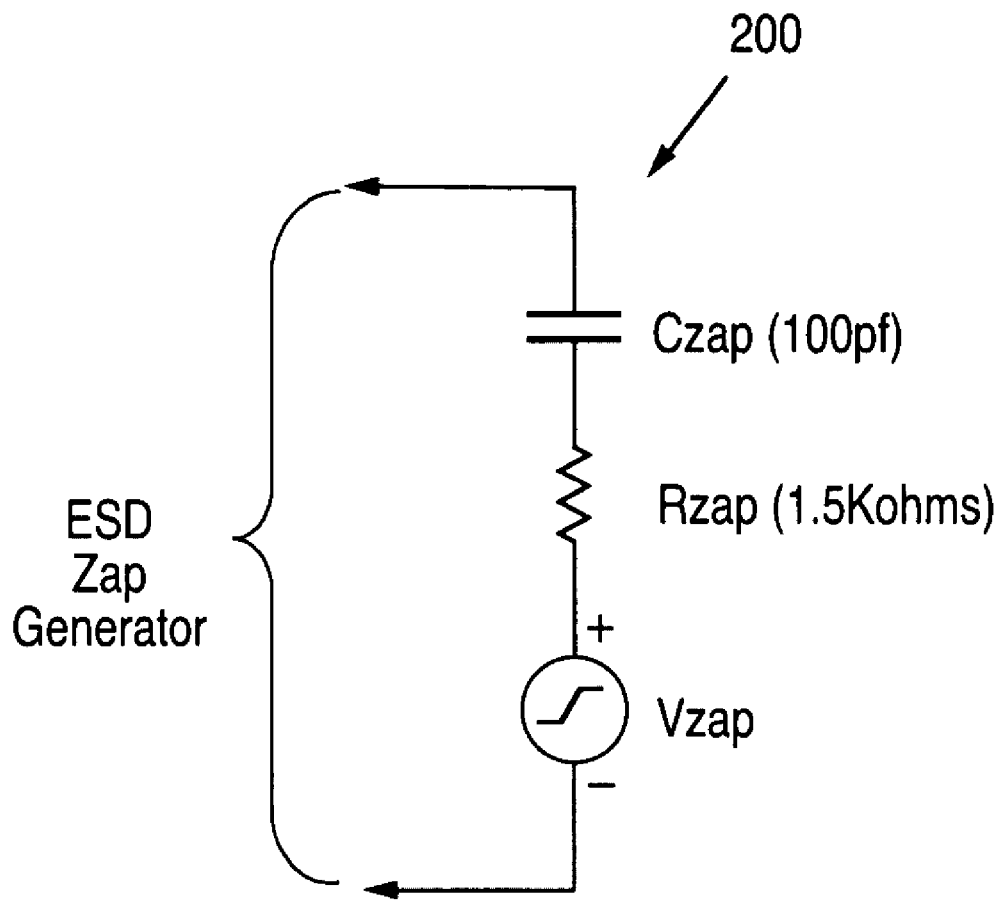
FIG. 2 is a schematic diagram illustrating a prior-art ESD zap generator 200.
Figure 4:
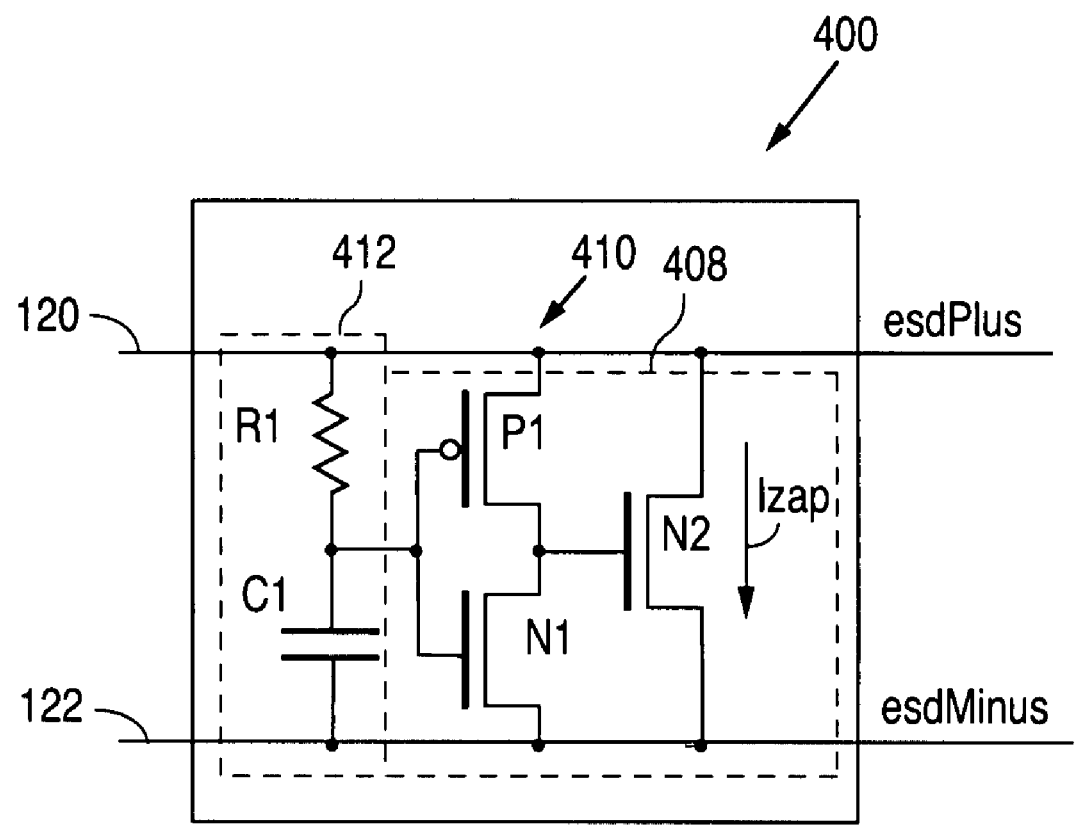
FIG. 4 is a schematic diagram illustrating a prior-art RC time constant based ESD switch 400.
Figures 5A, 5B, 5C:
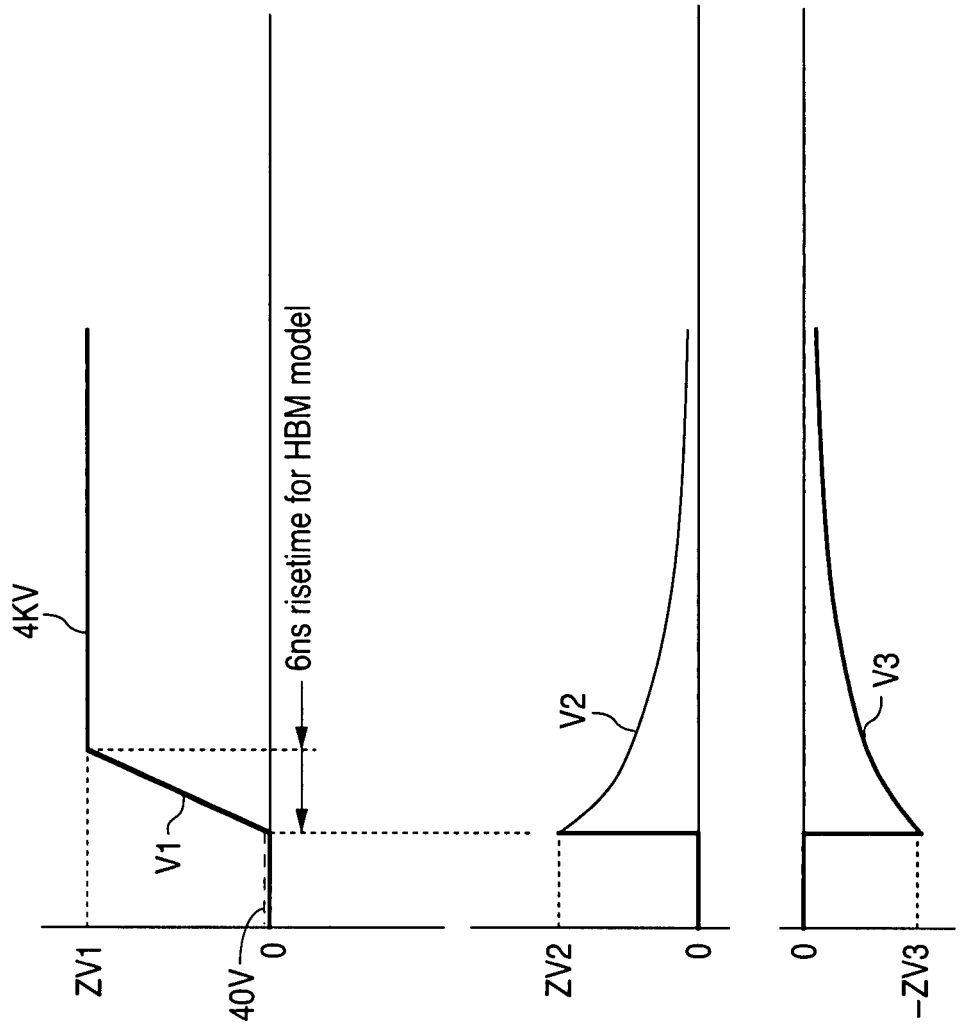
FIGS. 5A-5C are waveform diagrams illustrating a prior-art power-off ESD zap.
Figure 6:
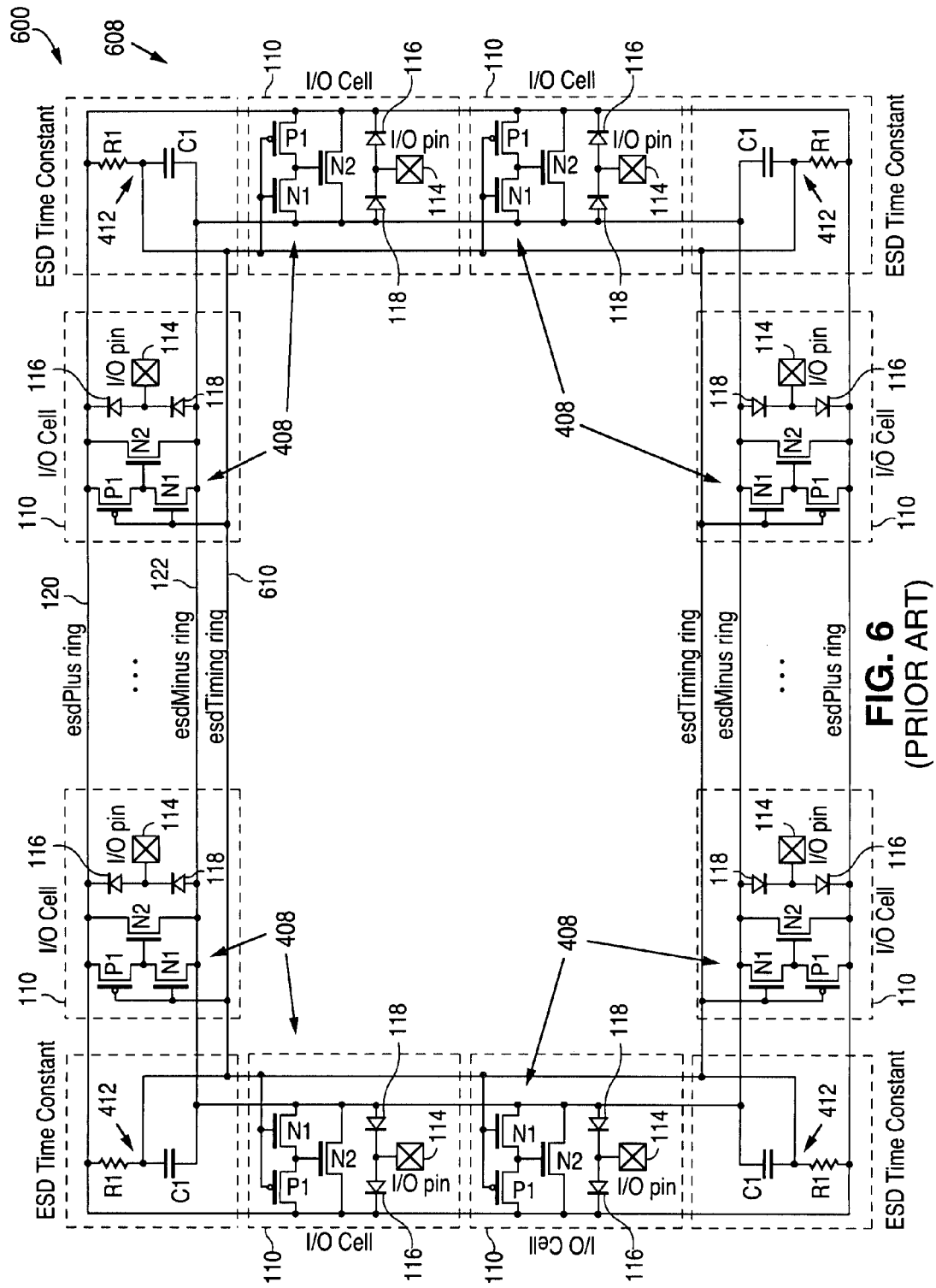
FIG. 6 is a schematic diagram illustrating a prior-art ESD protected chip 600.

Referring to FIG. 18, it can be seen that each triggerswitch 1812 is identical to triggerswitch 400 shown in FIG. 4 and, as a result, utilizes the same reference numerals. A triggerswitch 1812 differs from ESD switch circuit 724 in that the triggerswitch 1812 does not have a transistor circuit 408 located in each I/O cell 710. Instead, like switch 124 shown in FIG. 1 when implemented with triggerswitch 400 shown in FIG. 4, each triggerswitch 1812 has a transistor circuit 408 and an RC time constant circuit 412 located in each corner of chip 1800.

Thus, chip 1800 is also similar to chip 300. As previously discussed, chip 300 is an example of a prior-art ESD corner switch circuit that utilizes switch 124 which, in turn, can be implemented with triggerswitch 400 shown in FIG. 4. Therefore, as discussed above, chip 300 can only ESD protect a CMOS chip when VDD power is off, but not when VDD power is on.

Referring to FIG. 18, chip 1800 is also an ESD corner switch circuit, except that it utilizes the present invention. Therefore, chip 1800 can ESD protect a CMOS chip when VDD power is off, and also when VDD power is on.

Figure 3:
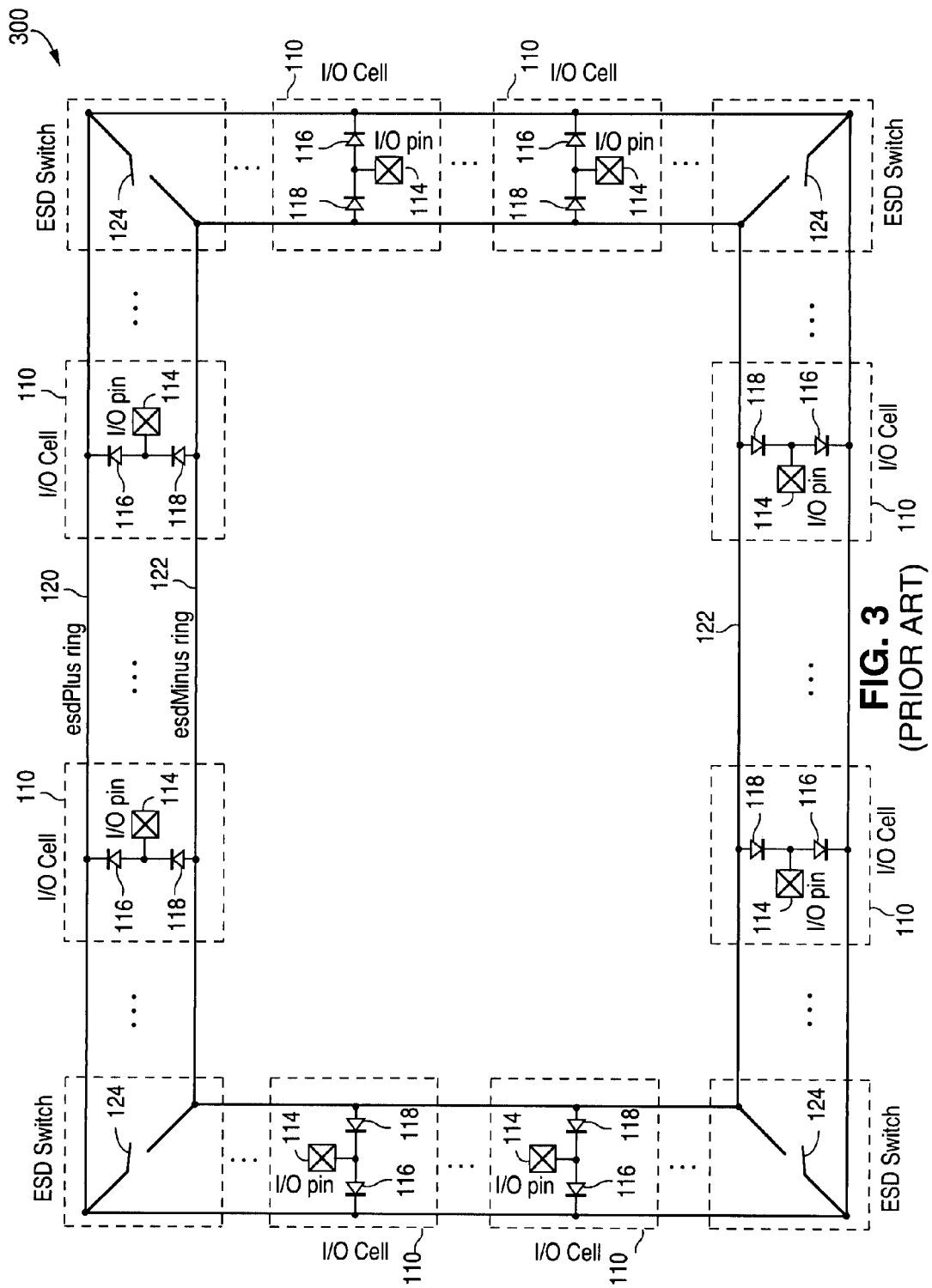
FIG. 3 is a schematic diagram illustrating a prior-art ESD protected chip 300.

Comparing FIGS. 3 and 18, it can be seen that both circuits contain four corner switches 124 and 1812, respectively, a high current esdPlus ring 120 and 720, respectively, and a high current esdMinus ring 122 and 722, respectively. Furthermore, both circuits also contain an upper ESD diode 116 and 716, respectively, and a lower ESD diode 118 and 718, respectively, which are located inside of each I/O cell 110 and 710, respectively. Therefore, the main difference between the two ESD circuits is that ESD protected circuit 1800 contains two low current rings (esdTiming ring and VDDbias ring), whereas ESD protected circuit 300 does not. Furthermore, ESD protected circuit 1800 also contains three small circuit components (P2, N3 and RA) in each I/O cell, whereas the ESD circuit 300 does not.

Despite the fact that chip 1800 has three extra circuit components in each I/O cell 710, and two extra (low current) circuit rings 730 and 1420, both circuits will occupy approximately the same chip area. The main reason for this is that, for both circuits, most of the cell area is taken up by the two large ESD diodes, and the two 'fat' (high current) ESD rings. In other words, because the present invention only adds three extra circuit components to each I/O cell, and the components are very small, the present invention is extremely area efficient. Furthermore, since the present invention does not draw any DC current during normal chip operation, it is also extremely power efficient.

There are many applications in which CMOS I/O pins must drive and receive signals from very long cables, such as 100 meter twisted pair Ethernet cables. Furthermore, since long cables are especially prone to being zapped by human beings while VDD power is on, power-on ESD protection of 'long cable pins' is a high priority.

As discussed above, the prior art ESD protection circuit 300 does not offer power-on ESD protection. Thus, present day CMOS chips usually implement power-on ESD protection of long cable pins by using snapback transistors or SCR devices. Nevertheless, use of these devices for ESD protection has several disadvantages.

For example, unlike the ESD protection circuits described above, the ESD performance of snapback transistors and SCR devices cannot be predicted using a circuit simulator such as Spice. As a result, the ESD performance of these devices can be inconsistent. Furthermore, SCR devices can suffer from holding current problems and false turn on problems, especially when fast rise/fall times are present on the I/O pins. Similarly, snapback devices can suffer from inconsistent reverse breakdown voltage due to junction parameters that cannot be tightly controlled.

Although the present invention can be used to ESD protect all of the pins on a CMOS chip, it can also be used to provide power-on ESD protection for only a group of pins on a CMOS chip, such as the 'long cable pins' described above. Thus, in accordance with the present invention, two long cable pins can be protected using a single triggerswitch. Furthermore, as illustrated in the above examples, any reasonable number of long cable pins can also be ESD protected as a group, using only a single triggerswitch.

In summary, the present invention can be used to ESD protect long cable pins when VDD power is on, and when VDD power is off. In addition, by utilizing the present invention, chip designers can tightly control ESD performance by running simple Spice circuit simulations.

As discussed above, for a power-off ESD zap, the resistance of the esdTiming ring can be relatively high because the voltage on this ring is not required to change during a power-off ESD zap (i.e. the ring voltage must remain close to 0V). However, during a power-on ESD zap, the voltage on the esdTiming ring must quickly drop from approximately VDD to 0V (ground). Thus, for a power-on ESD zap, the resistance of the esdTiming ring is important.

In other words, the resistance of the esdTiming ring must be low enough to allow the voltage on the ring to quickly fall to ground. Normally this is not a problem, unless the total capacitance on the esdTiming ring becomes too high. This condition can be easily avoided, however, by choosing a C1 capacitor value that is not too high. Furthermore, when the C1 values are not too high, the size of the NMOS pull down transistors N3 can be reduced.

As shown in FIG. 18, for an I/O cell 710 that is being positively zapped, NMOS pull down transistor N3 must turn on and sink current from the R1 resistor(s) that are present in the corner(s) of the chip. Furthermore, when NMOS pull down transistor N3 in a positively zapped I/O cell 710 is turned on, its resistance must be low enough to allow all of the switch transistors N2 to turn on. In other words, the voltage at the drain of the NMOS pull down transistor N3 must be low enough, to allow the outputs of the P1/N1 inverters 410 to rise high enough, to fully turn on all of the switch transistors N2.

Referring to FIG. 18, it can be seen that the R1 resistor value(s) should not be made too low, in order to keep the size of the NMOS N3 transistors small. In other words, higher R1 values are preferred over lower R1 values. Moreover, for the reasons discussed above, lower C1 values are preferred over higher C1 values. Thus, in summary, the ESD time constant should be implemented using higher R1 values and lower C1 values.

Figure 19:
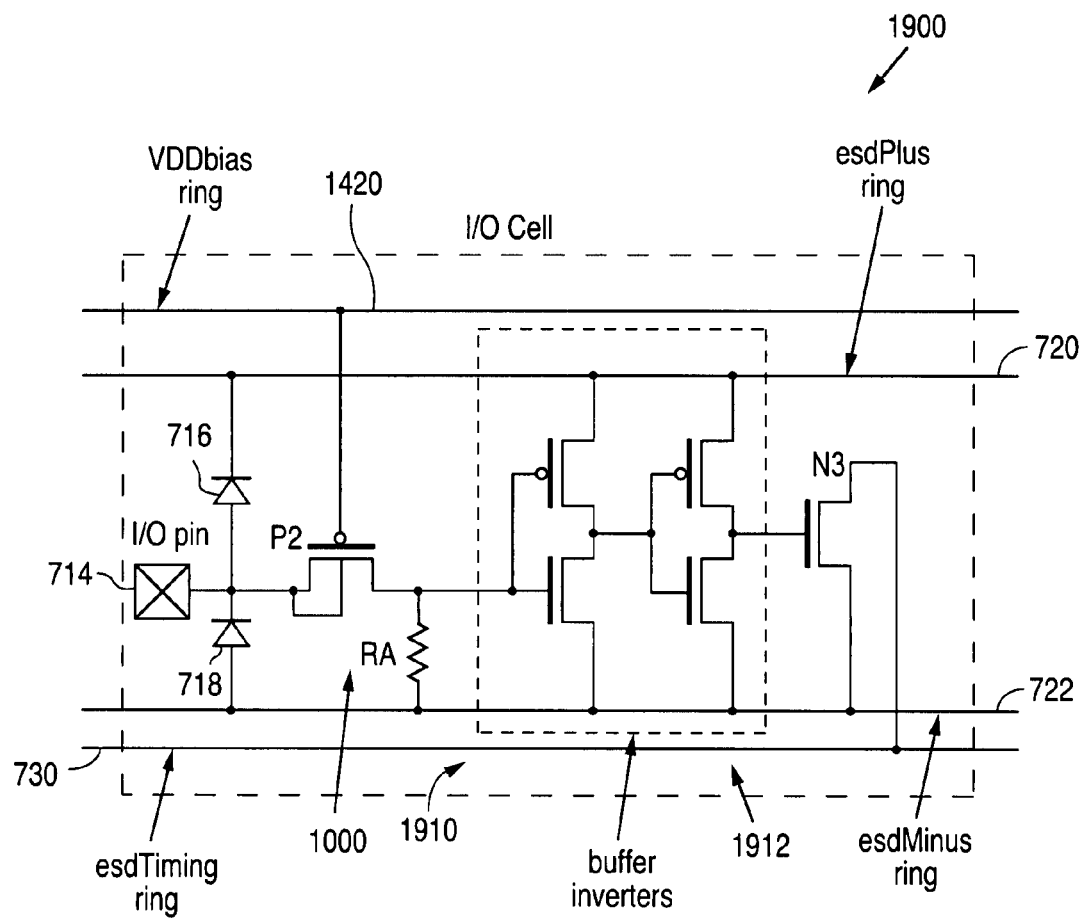
FIG. 19 is a schematic diagram illustrating an example of a portion of an ESD protection circuit 1900, in accordance with the present invention.

In accordance with the present invention, FIG. 19 shows a schematic diagram that illustrates an example of a portion of an ESD protection circuit 1900. Circuit 1900 is similar to circuit 1110, except that circuit 1900 includes two buffer inverters, 1910 and 1912, that are connected between the drain of PMOS transistor P2 and the gate of NMOS transistor N3.

Nevertheless, if I/O cell 710 has been properly designed, the two buffer inverters 1910 and 1912 will not be required. In other words, buffer inverters 1910 and 1912 will only be needed when the N3 NMOS transistors have been made too large, and transistor P2 must be kept small.

It should be understood that the above descriptions are examples of the present invention, and that various alternatives of the invention described herein may be employed in practicing the invention. Thus, it is intended that the following claims define the scope of the invention, and that structures and methods within the scope of these claims, and their equivalents, be covered thereby.

What is claimed is:

1. An integrated circuit chip comprising:
   a first external electrical connection structure;
   a first diode having an anode and a cathode, the anode of the first diode being connected to the first external electrical connection structure;
   a second diode having an anode and a cathode, the cathode of the second diode being connected to the first external electrical connection structure;
   a second external electrical connection structure, the second external electrical connection structure being unconnected to the first external electrical connection structure;
   a third diode having an anode and a cathode, the anode of the third diode being unconnected to the first external electrical connection structure, the cathode of the third diode being connected to the second external electrical connection structure;
   a comparator being connected to the first external electrical connection structure and the second external electrical connection structure;
   a transistor connected to the comparator, the transistor turning on in response to the comparator turning on, turning off in response to the comparator turning off, and being unconnected to the first external electrical connection; and
   an inverter connected to the cathode of the first diode and the anode of the second diode, the inverter having an input and an output, the input of the inverter being directly connected to the transistor, the input of the inverter being unconnected to the comparator.

2. The integrated circuit of claim 1 and further comprising:
   a switch being connected to the cathode of the first diode, the output of the inverter, and the anode of the second diode, no node of the switch being connected to the first external electrical connection structure, the switch electrically connecting the cathode of the first diode to the anode of the second diode when the switch is turned on, and electrically disconnecting the cathode of the first diode from the anode of the second diode when the switch is turned off;
   a resistive structure having a first node and a second node, the first node of the resistive structure being connected to the cathode of the first diode and the switch, the second node being connected to the input of the inverter; and
   a capacitive structure having a first plate connected to the second node of the resistive structure, and a second plate connected to the anode of the second diode and the switch.

3. The integrated circuit of claim 2 and further comprising an inverter having an input and an output, the input of the inverter being connected to the first external electrical connection structure.

4. The integrated circuit chip of claim 2 wherein the comparator includes:
   a comparative circuit having a positive input, a negative input, an output connected to the output circuit, a power node connected to the second external electrical connection structure, and a ground node;
   a capacitive element connected to the first external electrical connection structure;
   a first resistive element connected to the second external electrical connection structure and the negative input;
   a second resistive element connected to the first resistive element, the negative input, and the ground node;
   a third resistive element connected to the capacitive element and the positive input; and
   a fourth resistive element connected to the third resistive element, the positive input, and the ground node.

5. The integrated circuit chip of claim 1 wherein the comparator includes:
   a comparator transistor having a first node, a second node, and a third node, the first node being connected to the first external electrical connection structure, the second node being connected to the second external electrical connection structure; and a resistive structure connected to the third node of the comparator transistor and the anode of the second diode.

6. The integrated circuit chip of claim 5 wherein the comparator transistor has a substrate connected to the first external electrical connection structure.

7. The integrated circuit chip of claim 5 wherein the comparator transistor has a substrate connected to the second external electrical connection structure.

8. The integrated circuit chip of claim 5 wherein the comparator transistor has a substrate connected to the second external electrical connection structure via a resistive element.

9. The integrated circuit of claim 1 and further comprising:
a first switching circuit having a first switch, a first resistive structure, and a first capacitor, the first switch being connected to the cathode of the first diode and the anode of the second diode, no node of the first switch being connected to the first external electrical connection structure, the first resistive structure having a first node and a second node, the first node of the first resistive structure being connected to the cathode of the first diode and the first switch, the first capacitive structure having a first plate connected to the second node of the first resistive structure, and a second plate connected to the anode of the second diode and the first switch;

a second switching circuit having a second switch, a second resistive structure, and a second capacitor, the second switch being connected to the cathode of the first diode and the anode of the second diode, no node of the second switch being connected to the first external electrical connection structure, the second resistive structure having a first node and a second node, the first node of the second resistive structure being connected to the cathode of the first diode and the second switch, the second capacitive structure having a first plate connected to the second node of the second resistive structure, and a second plate connected to the anode of the second diode and the second switch;

a third switching circuit having a third switch, a third resistive structure, and a third capacitor, the third switch being connected to the cathode of the first diode and the anode of the second diode, no node of the third switch being connected to the first external electrical connection structure, the third resistive structure having a first node and a second node, the first node of the third resistive structure being connected to the cathode of the first diode and the third switch, the third capacitive structure having a first plate connected to the second node of the third resistive structure, and a second plate connected to the anode of the second diode and the third switch; and a fourth switching circuit having a fourth switch, a fourth resistive structure, and a fourth capacitor, the fourth switch being connected to the cathode of the first diode and the anode of the second diode, no node of the fourth switch being connected to the first external electrical connection structure, the fourth resistive structure having a first node and a second node, the first node of the fourth resistive structure being connected to the cathode of the first diode and the fourth switch, the fourth capacitive structure having a first plate connected to the second node of the fourth resistive structure, and a second plate connected to the anode of the second diode and the fourth switch, each switching circuit being located in a corner of the integrated circuit.

10. An integrated circuit chip comprising:
a first external electrical connection structure;
a first diode having an anode and a cathode, the anode of the first diode being connected to the first external electrical connection structure;
a second diode having an anode and a cathode, the cathode of the second diode being connected to the first external electrical connection structure;
a second external electrical connection structure, the second external electrical connection structure being unconnected to the first external electrical connection structure;
a third diode having an anode and a cathode, the anode of the third diode being unconnected to the first external electrical connection structure, the cathode of the third diode being connected to the second external electrical connection structure;
a comparator being connected to the first external electrical connection structure and the second external electrical connection structure;
a switch being connected to the cathode of the first diode and the anode of the second diode, no node of the switch being connected to the first external electrical connection structure, the switch electrically connecting the cathode of the first diode to the anode of the second diode when the switch is turned on, and electrically disconnecting the cathode of the first diode from the anode of the second diode when the switch is turned off;
an output circuit connected to the comparator, the output circuit to sink a current when the comparator outputs a turn-on voltage level, and sink no current when the comparator outputs a turn-off voltage level; and
an inverting circuit having an input connected to the output circuit and an output directly connected to the switch.

11. The integrated circuit chip of claim 1 wherein the comparator further comprises a pair of serially connected inverters connected to the transistor.

12. An integrated circuit chip comprising:
a first external electrical connection structure;
a first diode having an anode and a cathode, the anode of the first diode being connected to the first external electrical connection structure;
a second diode having an anode and a cathode, the cathode of the second diode being connected to the first external electrical connection structure;
a second external electrical connection structure, the second external electrical connection structure being unconnected to the first external electrical connection structure;
a third diode having an anode and a cathode, the cathode of the third diode being connected to the second external electrical connection structure;
a comparator being connected to the first external electrical connection structure and the second external electrical connection structure;
a first switch having a first node connected to the cathode of the first diode and a second node connected to the anode of the second diode, no node of the first switch being connected to the first external electrical connection structure, the first switch electrically connecting the cathode of the first diode to the anode of the second diode when the first switch is turned on, and electrically disconnecting the cathode of the first diode from the anode of the second diode when the first switch is turned off;

a second switch having a first node connected to the second external electrical connection structure and a second node connected to the anode of the third diode, the second switch electrically connecting the second external electrical connection structure to the anode of the third diode when the second switch is turned on, and electrically disconnecting the second external electrical connection structure from the anode of the third diode when the second switch is turned off, the cathode of the first diode being unconnected to the first node of the second switch; and a comparator connected to the first node of the second switch.

13. The integrated circuit of claim 12 wherein the first node of the first switch is unconnected to the first node of the second switch.

14. An integrated circuit chip comprising:

a first external electrical connection structure;

a first diode having an anode and a cathode, the anode of the first diode being connected to the first external electrical connection structure;

a second diode having an anode and a cathode, the cathode of the second diode being connected to the first external electrical connection structure;

a second external electrical connection structure, the second external electrical connection structure being unconnected to the first external electrical connection structure;

a third diode having an anode and a cathode, the cathode of the third diode being connected to the second external electrical connection structure;

a first comparator being connected to the first external electrical connection structure and the second external electrical connection structure;

a first switch having a first node connected to the cathode of the first diode and a second node connected to the anode of the second diode, no node of the first switch being connected to the first external electrical connection structure, the first switch electrically connecting the cathode of the first diode to the anode of the second diode when the first switch is turned on, and electrically disconnecting the cathode of the first diode from the anode of the second diode when the first switch is turned off;

a second switch having a first node connected to the second external electrical connection structure and a second node connected to the anode of the third diode, the second switch electrically connecting the second external electrical connection structure to the anode of the third diode when the second switch is turned on, and electrically disconnecting the second external electrical connection structure from the anode of the third diode when the second switch is turned off, the cathode of the first diode being unconnected to the first node of the second switch;

a second comparator connected to the first node of the second switch;

a third external electrical connection structure;

a fourth diode having an anode and a cathode, the anode of the fourth diode being connected to the third external electrical connection structure;

a fifth diode having an anode and a cathode, the cathode of the fifth diode being connected to the third external electrical connection structure;

a third comparator being connected to the second external electrical connection structure and the third external electrical connection structure; and a third switch having a first node connected to the cathode of the fourth diode and a second node connected to the anode of the fifth diode, no node of the third switch being connected to the third external electrical connection structure, the third switch electrically connecting the cathode of the fourth diode to the anode of the fifth diode when the third switch is turned on, and electrically disconnecting the cathode of the fourth diode from the anode of the fifth diode when the third switch is turned off.

15. The integrated circuit of claim 14 wherein the cathode of the first diode is unconnected to the first node of the third switch.

16. The integrated circuit of claim 14 wherein the cathode of the fourth diode is unconnected to the second external electrical connection structure.

17. The integrated circuit of claim 14 wherein the first node of the second switch is unconnected to the first node of the third switch.

18. The integrated circuit of claim 14 wherein the anode of the third diode is unconnected to the anode of the fifth diode.

19. The integrated circuit of claim 14 wherein the cathode of the fourth diode is connected to the second external electrical connection structure.

20. The integrated circuit of claim 14 wherein the first node of the second switch is connected to the first node of the third switch.

* * * * *

UNITED STATES PATENT AND TRADEMARK OFFICE
CERTIFICATE OF CORRECTION

| | | |
|---|---|---|
| PATENT NO. | : 7,978,454 B1 | Page 1 of 1 |
| APPLICATION NO. | : 11/888472 | |
| DATED | : July 12, 2011 | |
| INVENTOR(S) | : Ronald Pasqualini | |

It is certified that error appears in the above-identified patent and that said Letters Patent is hereby corrected as shown below:

In the Title, delete "EVENT" and replace with --EVENTS--.

Signed and Sealed this
Thirtieth Day of August, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,978,454 B1 | Page 1 of 1 |
| APPLICATION NO. | : 11/888472 | |
| DATED | : July 12, 2011 | |
| INVENTOR(S) | : Ronald Pasqualini | |

It is certified that error appears in the above-identified patent and that said Letters Patent is hereby corrected as shown below:

Title Page, Item (54) and at column 1, line 3,
In the Title, delete "EVENT" and replace with --EVENTS--.

This certificate supersedes the Certificate of Correction issued August 30, 2011.

Signed and Sealed this
Eleventh Day of October, 2011

David J. Kappos
*Director of the United States Patent and Trademark Office*